(12) United States Patent
Murnan et al.

(10) Patent No.: US 10,850,850 B2
(45) Date of Patent: Dec. 1, 2020

(54) ADJUSTABLE ARMREST ASSEMBLY

(71) Applicant: Safran Seats USA LLC, Gainesville, TX (US)

(72) Inventors: Justin K. Murnan, Whitesboro, TX (US); Glenn A. Morgan, Corinth, TX (US); Damian F. Diaz Carrion, Denton, TX (US); Francisco Salcedo, Argyle, TX (US)

(73) Assignee: Safran Seats USA LLC, Gainesville, TX (US)

( * ) Notice: Subject to any disclaimer, the term of this patent is extended or adjusted under 35 U.S.C. 154(b) by 105 days.

(21) Appl. No.: 16/301,986

(22) PCT Filed: May 12, 2017

(86) PCT No.: PCT/US2017/032313
§ 371 (c)(1),
(2) Date: Nov. 15, 2018

(87) PCT Pub. No.: WO2017/200858
PCT Pub. Date: Nov. 23, 2017

(65) Prior Publication Data
US 2019/0283883 A1 Sep. 19, 2019

Related U.S. Application Data

(60) Provisional application No. 62/337,021, filed on May 16, 2016.

(51) Int. Cl.
*B64D 11/06* (2006.01)
*B60N 2/75* (2018.01)

(52) U.S. Cl.
CPC .......... *B64D 11/0644* (2014.12); *B60N 2/753* (2018.02); *B60N 2/767* (2018.02); *B60N 2/77* (2018.02)

(58) Field of Classification Search
CPC .... B64D 11/0644; B60N 2/767; B60N 2/753; B60N 2/77
See application file for complete search history.

(56) References Cited

U.S. PATENT DOCUMENTS 4,097,088 A * 6/1978 Meiller ..................... B60N 2/77
297/411.38
4,219,235 A 8/1980 Heling
(Continued)

FOREIGN PATENT DOCUMENTS

| CN | 103935274 A | 7/2014 |
| GB | 2058559 A | 4/1981 |
| WO | 20130163260 A1 | 10/2013 |

OTHER PUBLICATIONS

International Patent Application No. PCT/US2017/032313, International Search Report and Written Opinion, dated Jul. 31, 2017.

*Primary Examiner* — David R Dunn
*Assistant Examiner* — Tania Abraham
(74) *Attorney, Agent, or Firm* — Kilpatrick Townsend & Stockton LLP

(57) ABSTRACT

An armrest assembly for a passenger seat includes a pivot member (101) attached to a seat frame (10), at least one armrest spine (102) attached to the pivot member (101), and at least one set screw (106) for adjusting a position of the pivot member relative to the seat frame. A pivot fastener (112) extends through a center hole of the pivot member (101) and through a first hole of the at least one armrest spine (102). A pin (110) extends through an arc slot of the pivot member (101) and through a second hole of the at least one armrest spine (102).

24 Claims, 24 Drawing Sheets

(56) References Cited

U.S. PATENT DOCUMENTS

| | | | | | |
|---|---|---|---|---|---|
| 4,968,095 | A | * | 11/1990 | Moyer | B60N 2/767 297/411.39 |
| 5,566,778 | A | * | 10/1996 | Valier | B60K 20/02 180/334 |
| 5,702,157 | A | * | 12/1997 | Hurite | B60N 2/767 297/411.38 |
| 6,883,871 | B2 | * | 4/2005 | Nae | B60N 2/777 297/411.32 |
| 8,132,861 | B2 | * | 3/2012 | Cone | B60N 2/753 297/411.32 |
| 8,931,847 | B2 | * | 1/2015 | Cailleteau | B64D 11/0627 297/411.32 |
| 9,016,793 | B2 | * | 4/2015 | Roeglin | A47C 7/543 |
| 2014/0167477 | A1 | * | 6/2014 | Ott | B60N 2/767 297/411.34 |
| 2015/0108815 | A1 | * | 4/2015 | Bhat | B60N 2/43 297/411.32 |

* cited by examiner

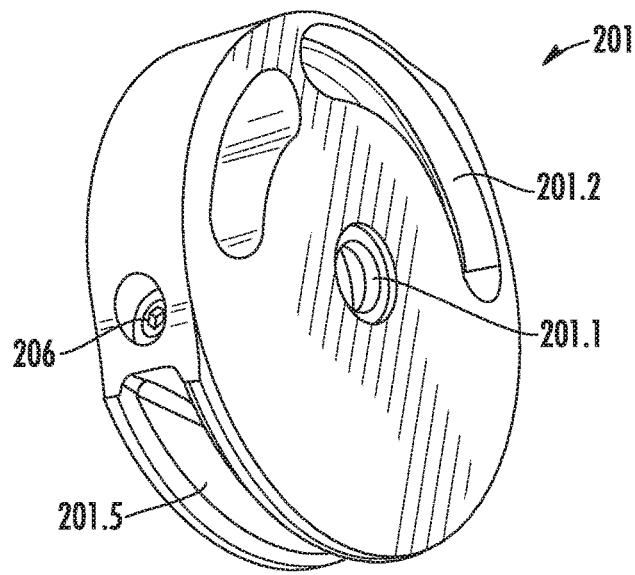

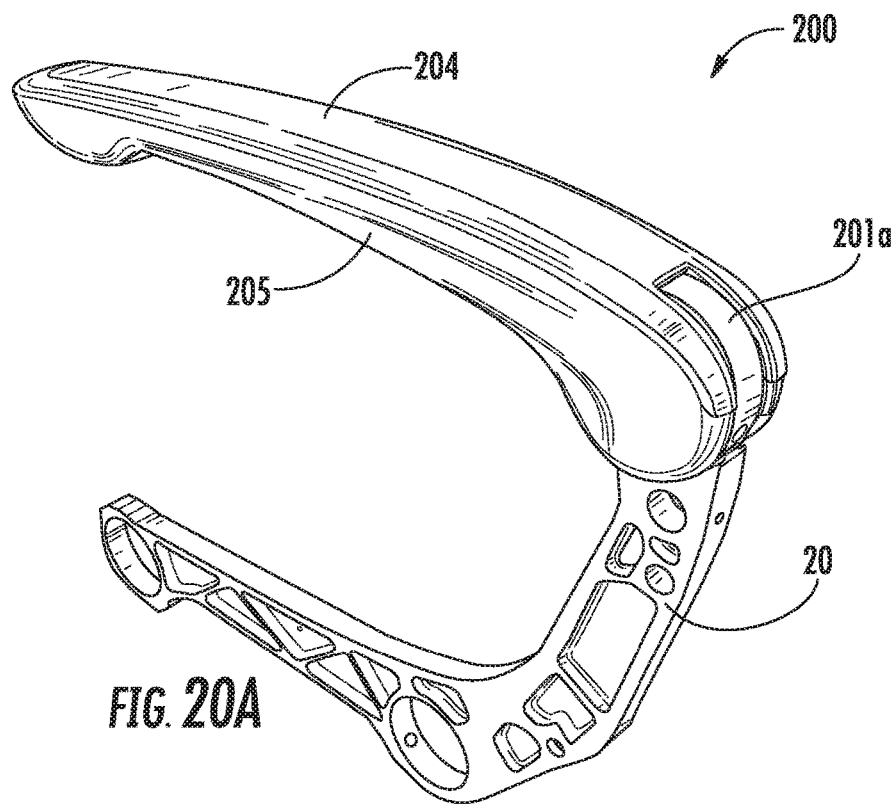
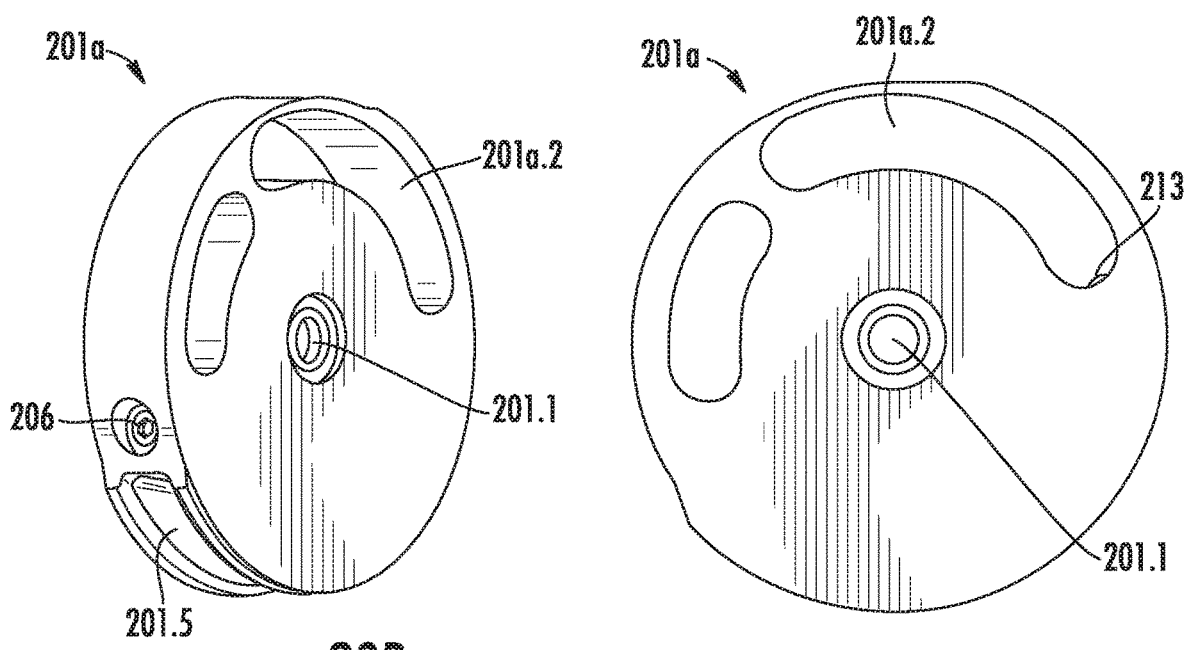
FIG. 20A
FIG. 20B
FIG. 20C

ADJUSTABLE ARMREST ASSEMBLY

CROSS REFERENCE TO RELATED APPLICATION

This application is related to and claims priority benefit from U.S. Provisional Application No. 62/337,021 ("the '021 application"), filed on May 16, 2016, entitled ANGLE ADJUSTMENT SPREADER. The '021 application is hereby incorporated in its entirety by this reference.

FIELD OF THE INVENTION

The field of the invention relates to armrest assemblies for aircraft or the like.

BACKGROUND

Many passenger seats such as those on vehicles including passenger aircraft, buses, trains, and the like are arranged so that each passenger seat includes an armrest assembly on one or both sides of the seat to increase a passenger's comfort. For example, some seats may include a side adjacent to an aisle, a side adjacent to another seat, and/or a side adjacent to a window. Many conventional armrest assemblies are configured to pivot between a retracted (up) position and a deployed (down) position. However, conventional seats create a gap between the movable portion of the armrest and the remaining portion of the armrest assembly such that, when the armrest is moved to the deployed position, there is a pinch point between the movable portion of the armrest and the remaining portion of the armrest assembly. In addition, many conventional seats are not capable of adjusting the deployed or retracting the positions.

In certain situations, it may be desirable to design armrest assemblies to eliminate pinch points associated with the movement of the armrest and to allow adjustment of the location of the deployed and/or retracted positions for the armrest.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an armrest assembly for a passenger seat comprises: a pivot member attached to a seat frame; at least one armrest spine attached to the pivot member; and at least one set screw for adjusting a position of the pivot member relative to the seat frame, wherein: a pivot fastener extends through a center hole of the pivot member and through a first hole of the at least one armrest spine; and a pin extends through an arc slot of the pivot member and through a second hole of the at least one armrest spine.

In some embodiments, the pivot fastener also extends through a hole of an upper attachment portion of the seat frame.

In certain embodiments, the at least one armrest spine is pivotably attached to the pivot member; the at least one armrest spine rotates about the pivot fastener between a retracted position and a deployed position; and the pin travels along a length of the arc slot when the at least one armrest spine rotates.

The pivot member and an upper attachment portion of the seat frame, in certain embodiments, form an approximately continuous cylindrical surface such that a gap between (i) a movable portion of the armrest assembly and (ii) a static portion of the armrest assembly remains constant during rotation of the at least one armrest spine.

In some embodiments, the arc slot comprises a first end and a second end; the first end stops the pin to define a deployed position for the at least one armrest spine; and the second end stops the pin to define a retracted position for the at least one armrest spine.

In certain embodiments, the arc slot comprises a constant width along its full length.

At least one of the first end and the second end, in certain embodiments, comprise an enlarged portion with a larger width than other portions of the arc slot.

In some embodiments, the pin comprises at least two portions with different diameters including an increased diameter portion; the increased diameter portion approximately matches an internal shape of the enlarged portion; and the armrest assembly comprises a spring for pushing the increased diameter portion into the enlarged portion.

In certain embodiments, the at least one set screw comprises a front set screw disposed in a hole on a front side of the seat frame and a rear set screw disposed in a hole on a rear side of the seat frame; the front set screw engages a front face of a lower protrusion of the pivot member such that the front set screw can be threaded toward the front face to rotate the pivot member and lower a distal end of the at least one armrest spine; and the rear set screw engages a rear face of the lower protrusion of the pivot member such that the rear set screw can be threaded toward the rear face to rotate the pivot member and raise a distal end of the at least one armrest spine.

The lower protrusion, in certain embodiments, comprises a rectangular cross section. In some embodiments, the lower protrusion comprises a curved "T" shape cross section.

In some embodiments, the at least one set screw comprises a front set screw disposed in a hole on a front side of the pivot member and a rear set screw disposed in a hole on a rear side of the pivot member; the front set screw engages a front face of an upper attachment portion of the seat frame such that the front set screw can be threaded toward the front face to rotate the pivot member and raise a distal end of the at least one armrest spine; and the rear set screw engages a rear face of the upper attachment portion of the seat frame such that the rear set screw can be threaded toward the rear face to rotate the pivot member and lower a distal end of the at least one armrest spine.

According to certain embodiments of the present invention, a passenger seat comprises: a seat frame; and an armrest assembly attached to an upper portion of the seat frame, the arm assembly comprising: a pivot member attached to the seat frame; an armrest spine attached to the pivot member; and at least one set screw for adjusting a position of the pivot member relative to the seat frame, wherein: a pivot fastener extends through a center hole of the pivot member and through a first hole of the armrest spine; and a pin extends through an arc slot of the pivot member and through a second hole of the armrest spine.

In some embodiments, the armrest spine is pivotably attached to the pivot member; the armrest spine rotates about the pivot fastener between a retracted position and a deployed position; and the pin travels along a length of the arc slot when the armrest spine rotates.

In certain embodiments, the pivot member and an upper attachment portion of the seat frame form an approximately continuous cylindrical surface such that a gap between (i) a movable portion of the armrest assembly and (ii) a static portion of the armrest assembly remains constant during rotation of the armrest spine.

The arc slot, in certain embodiments, comprises a first end and a second end; the first end stops the pin to define a deployed position for the armrest spine; and the second end stops the pin to define a retracted position for the armrest spine.

In some embodiments, at least one of the first end and the second end comprise an enlarged portion with a larger width than other portions of the arc slot.

In certain embodiments, the pin comprises at least two portions with different diameters including an increased diameter portion; the increased diameter portion approximately matches an internal shape of the enlarged portion; and the armrest assembly comprises a spring for pushing the increased diameter portion into the enlarged portion.

In some embodiments, the at least one set screw comprises a front set screw disposed in a hole on a front side of the seat frame and a rear set screw disposed in a hole on a rear side of the seat frame; the front set screw engages a front face of a lower protrusion of the pivot member such that the front set screw can be threaded toward the front face to rotate the pivot member and lower a distal end of the armrest spine; and the rear set screw engages a rear face of the lower protrusion of the pivot member such that the rear set screw can be threaded toward the rear face to rotate the pivot member and raise a distal end of the armrest spine.

In certain embodiments, the at least one set screw comprises a front set screw disposed in a hole on a front side of the pivot member and a rear set screw disposed in a hole on a rear side of the pivot member; the front set screw engages a front face of an upper attachment portion of the seat frame such that the front set screw can be threaded toward the front face to rotate the pivot member and raise a distal end of the armrest spine; and the rear set screw engages a rear face of the upper attachment portion of the seat frame such that the rear set screw can be threaded toward the rear face to rotate the pivot member and lower a distal end of the armrest spine.

BRIEF DESCRIPTION OF THE DRAWINGS

FIG. 20A is a perspective view of an armrest assembly according to certain embodiments of the present invention.

FIG. 20B is a perspective view of a pivot member of the armrest assembly of FIG. 20A.

FIG. 20C is a side view of a pivot member of the armrest assembly of FIG. 20A.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1-12 illustrate embodiments of passenger seats with armrest assemblies 100, FIGS. 13-20C illustrate embodiments of passenger seats with armrest assemblies 200, and FIGS. 21-24B illustrate embodiments of passenger seats with armrest assemblies 300.

Figure 1:
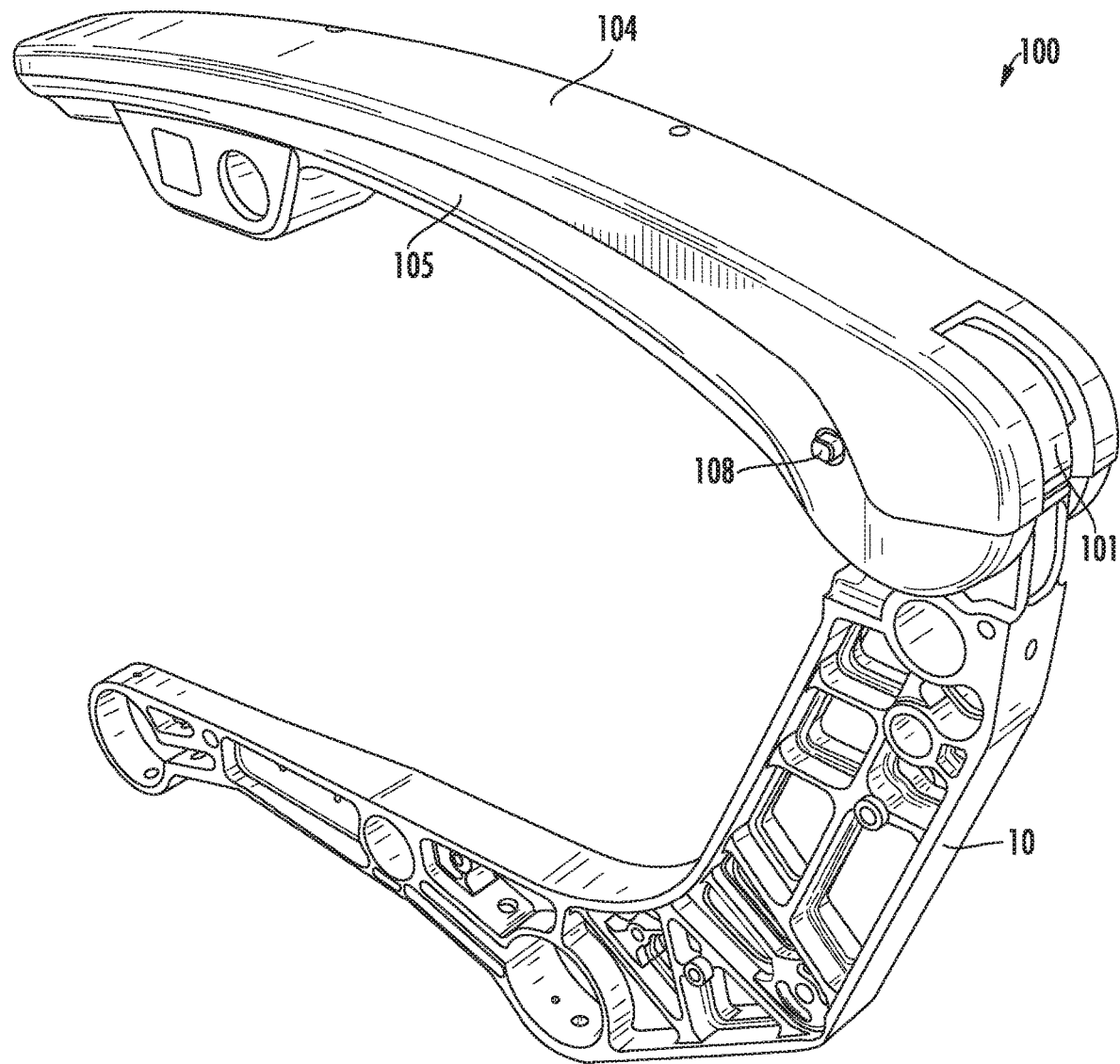
FIG. 1 is a perspective view of an armrest assembly according to certain embodiments of the present invention.

FIG. 1 shows an armrest assembly 100 in a deployed position and attached to a seat frame 10. The armrest assembly 100 may include at least one armrest cover. As one example, armrest assembly 100 may include an upper armrest cover 104 and a lower armrest cover 105 while, in other embodiments, the armrest assembly 100 may include a single armrest cover. The armrest assembly 100 may also include an armrest lock control 108 and a pivot member 101 that is located at an interface with the seat frame 10.

Figure 2:
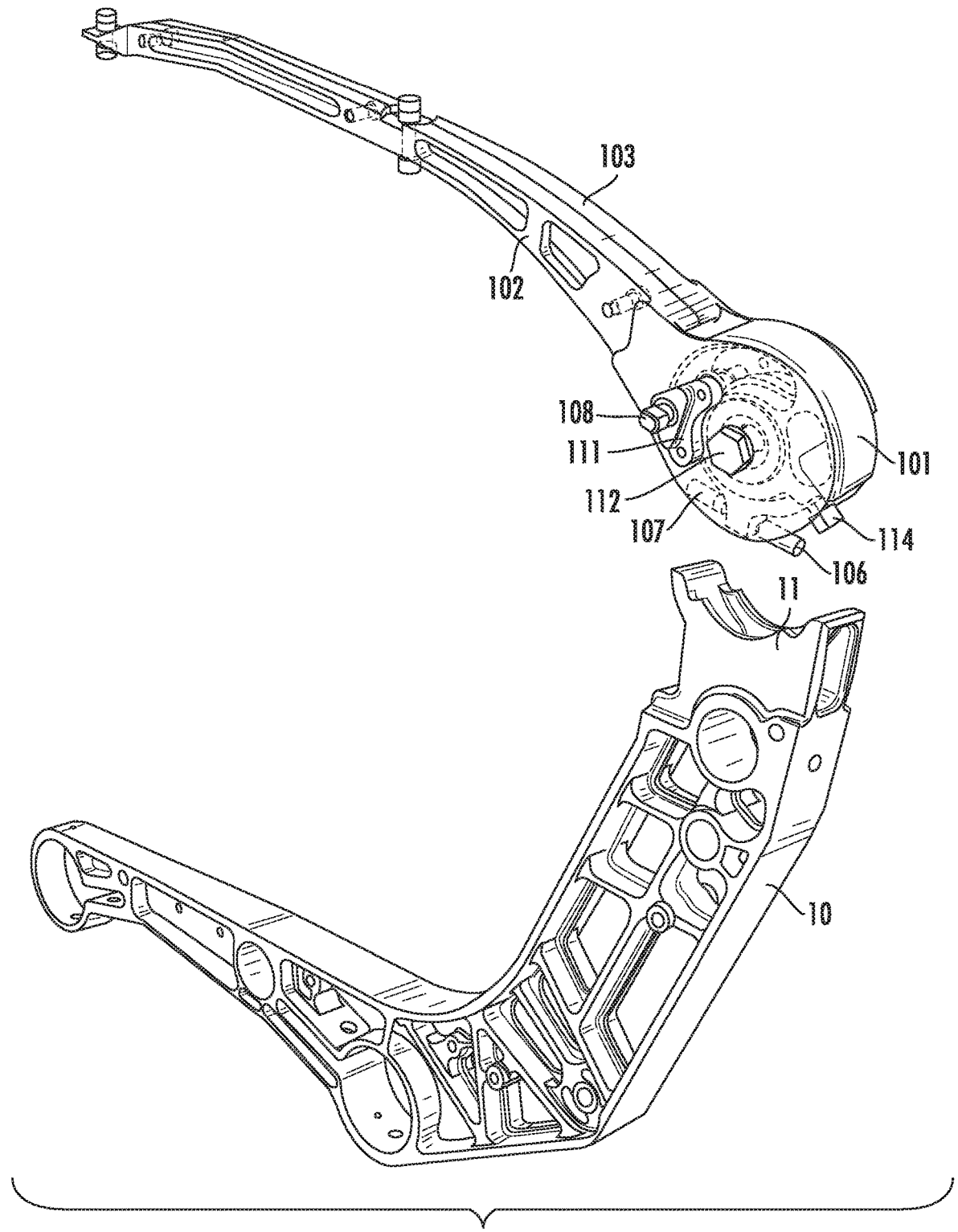
FIG. 2 is a partial perspective exploded view of the armrest assembly of FIG. 1.
Figure 3A:
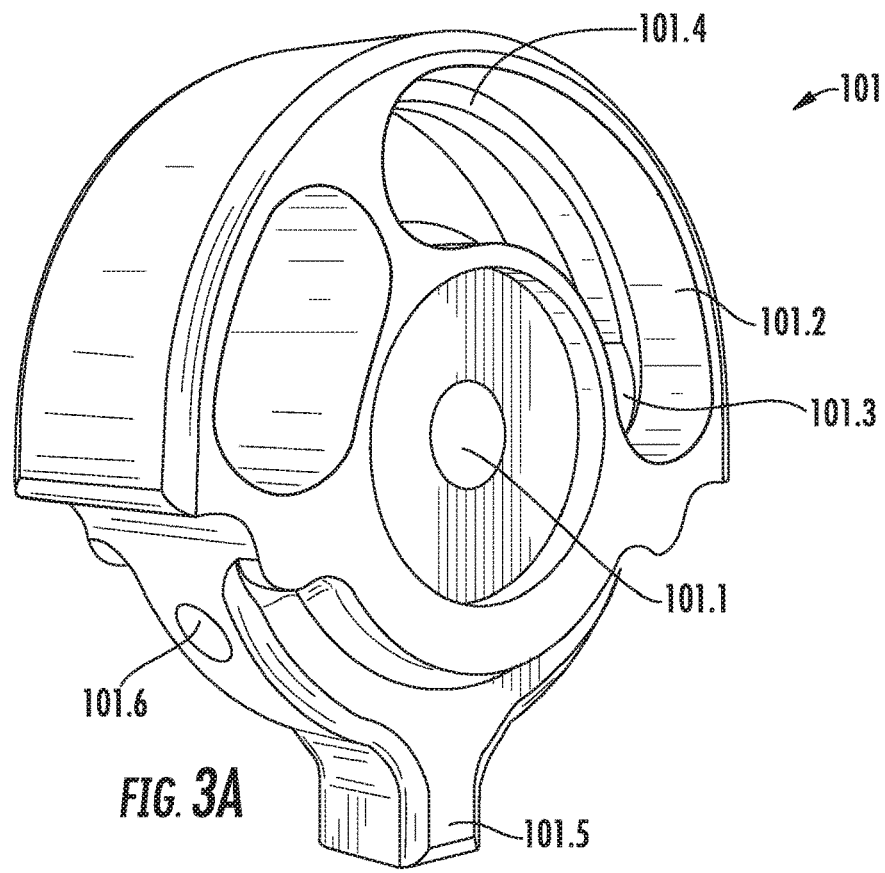
FIGS. 3A and 3B are perspective views of a pivot member of the armrest assembly of FIG. 1.
Figure 3B:
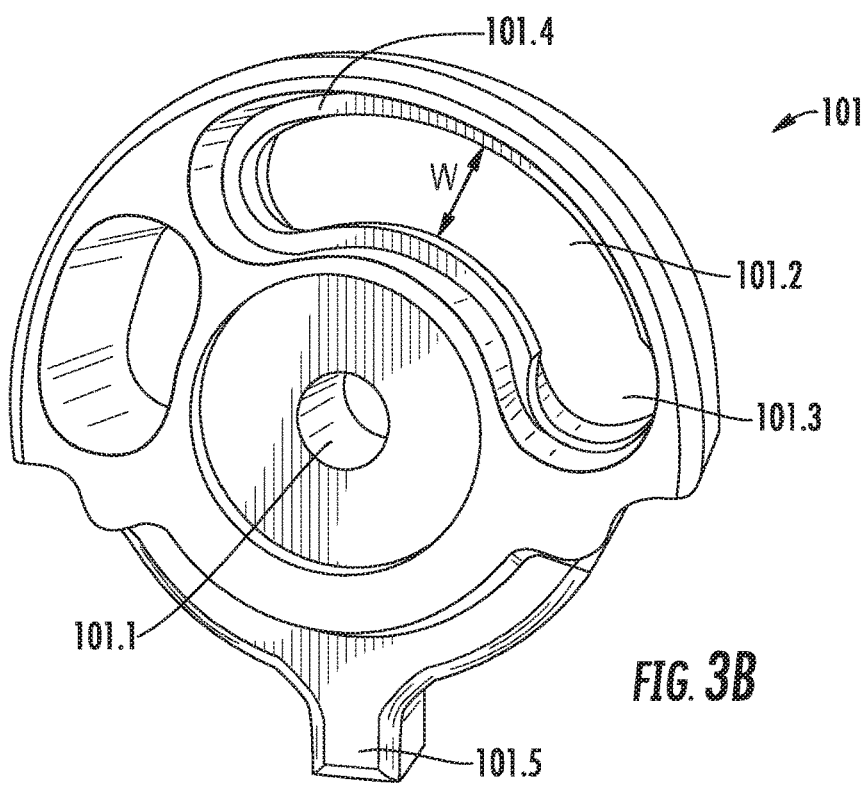

The upper armrest cover 104 and the lower armrest cover 105 are not shown in FIG. 2, which shows an exploded view of the armrest assembly 100. The pivot member 101 is attached to first armrest spine 102 and second armrest spine 103 that extend from the pivot member 101 to a distal end of the assembly (e.g., see distal end 102.3 of first armrest spine 102 in FIGS. 4A and 4B). Although FIGS. 2 and 4A-6 show two armrest spines (first armrest spine 102 and second armrest spine 103), the armrest spine may be a single component. In addition to forming the primary structural member to support loads related to passengers leaning or pushing on the armrest, the first armrest spine 102 and second armrest spine 103 facilitate attachment of the upper armrest cover 104 and the lower armrest cover 105. The first armrest spine 102 and second armrest spine 103 are attached to the pivot member 101 via pivot fastener 112 (through center hole 101.1 and hole 102.1) such that the first armrest spine 102 and second armrest spine 103 can rotate relative to the pivot member 101. The pivot member 101 is attached to the upper attachment portion 11 of the seat frame 10. The upper attachment portion 11 may form an arc shape with a recess for interfacing with a lower protrusion 101.5 of the pivot member 101 (see FIGS. 3A and 3B). The lower protrusion 101.5 may have a rectangular cross-section (as shown in FIGS. 3A and 3B) or any other appropriate shape. The lower protrusion 101.5 engages the recess of the upper attachment portion 11 to constrain movement of the pivot member 101 parallel to the axis of pivot fastener 112 (i.e., the lateral direction relative to the seat). The set screws 106, 107 (described below) constrain movement of the pivot member 101 in the fore/aft direction of the seat and constrain rotational movement of the pivot member 101 about center hole 101.1. To constrain movement of the pivot member 101 in the vertical direction (i.e., lifting off the seat frame 10), fastener 114 (described below) attaches the pivot member 101 and the seat frame 10.

Figure 8:
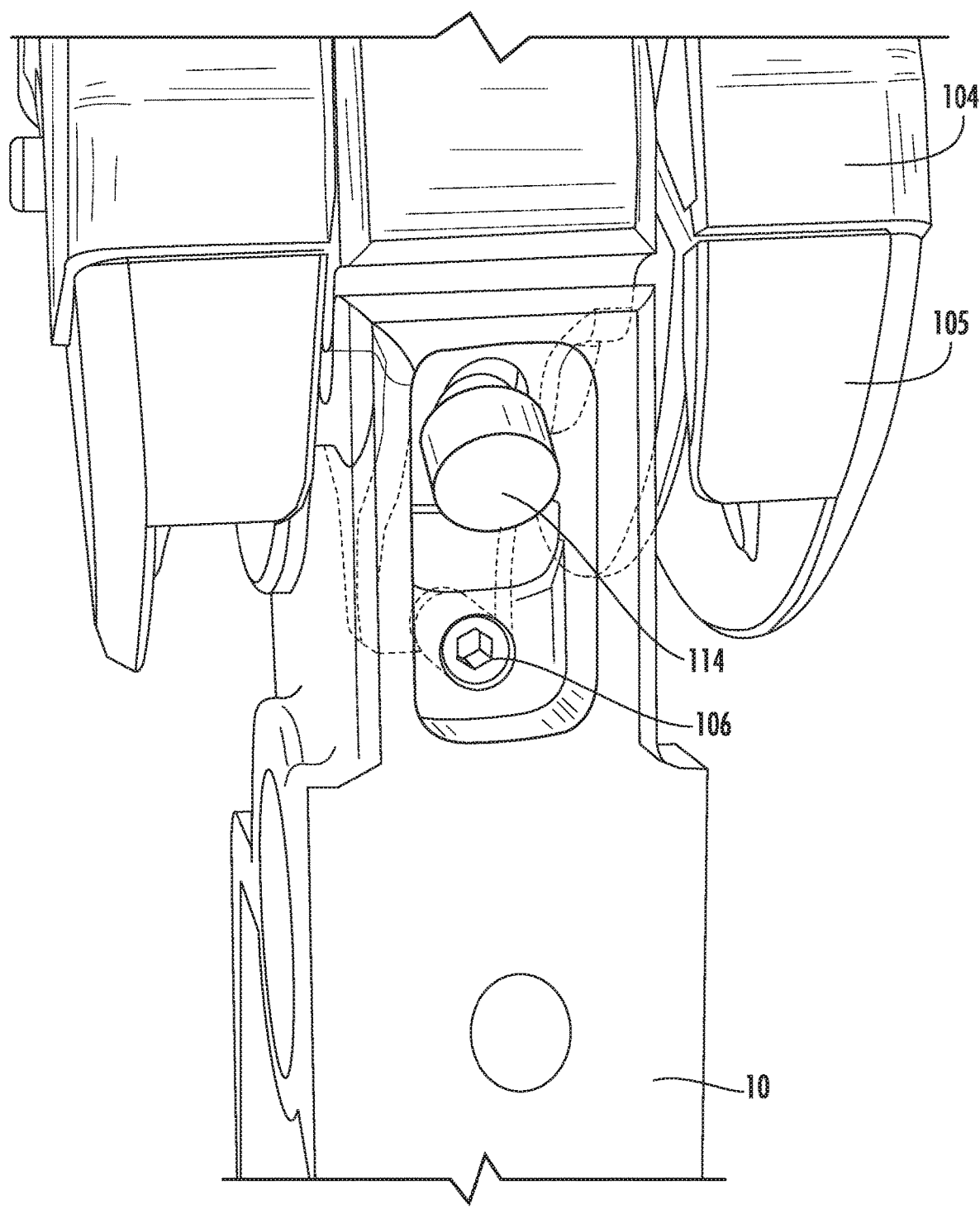
FIG. 8 is a detail perspective view of the armrest assembly of FIG. 1.
Figure 9A:
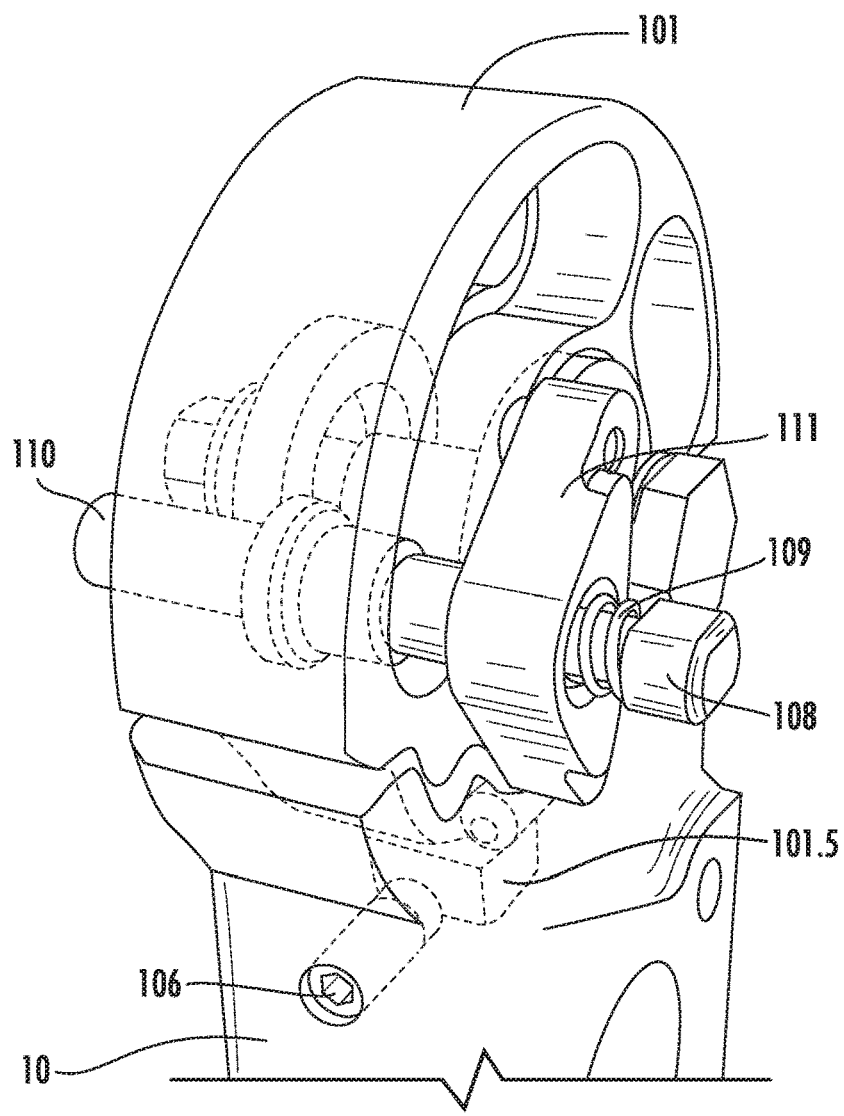
FIG. 9A is a detail partial perspective view of the armrest assembly of FIG. 1.
Figure 9B:
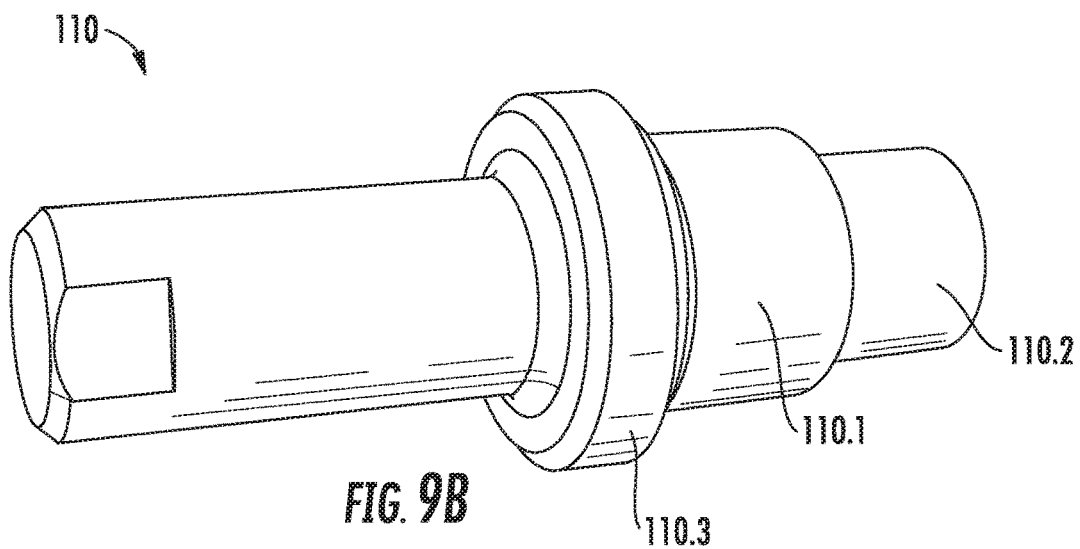
FIG. 9B is a perspective view of an armrest lock pin of the armrest assembly of FIG. 1.

After engaging the upper attachment portion 11 of the seat frame 10, the pivot member 101 is secured to the seat frame 10 by threading a fastener 114 through the upper attachment portion 11 into a threaded hole 101.6 in the pivot member 101 (see FIGS. 3A and 8). The upper attachment portion 11 may also include threaded holes for set screws 106 and 107, which allow adjustment of the deployed and/or retracted positions of the armrest. To adjust the pivot member 101 relative to the seat frame 10, the rear set screw 106 is tightened against (i.e., advanced toward) the lower protrusion 101.5 of the pivot member 101 (see FIG. 9A), which will cause the distal end of the armrest (e.g., distal end 102.3 of first armrest spine 102) to move up. The front set screw 107 can be tightened against the lower protrusion 101.5 of the pivot member 101, which will cause the distal end of the armrest (e.g., distal end 102.3 of first armrest spine 102) to move down.

As shown in FIGS. 3A and 3B, the pivot member 101 includes an arc slot 101.2, which is centered about center hole 101.1. The arc slot 101.2 is arranged such that a pin attached to at least one of the armrest spines (e.g., armrest lock pin 110, described below) travels along the length of the arc slot 101.2 when the spine(s) rotate relative to the pivot member 101. The ends of arc slot 101.2 may define limits for rotation of the armrest (i.e., deployed and retracted positions of the armrest). In some embodiments, the arc slot 101.2 includes at least one enlarged portion (such as enlarged portion 101.3), which has a larger width than the width W of the arc slot 101.2 (see FIG. 3B). In some embodiments, a rib 101.4 within the arc slot 101.2 defines the width W (i.e., some or all of rib 101.4 is removed at the location of the at least one enlarged portion). Although the drawings illustrate a single enlarged portion, the arc slot 101.2 may include an enlarged portion at each end of the arc slot 101.2 (corresponding to the deployed and retracted positions of the armrest) and/or may include at least one intermediate enlarged portion between the ends of the slot.

Figure 4A:
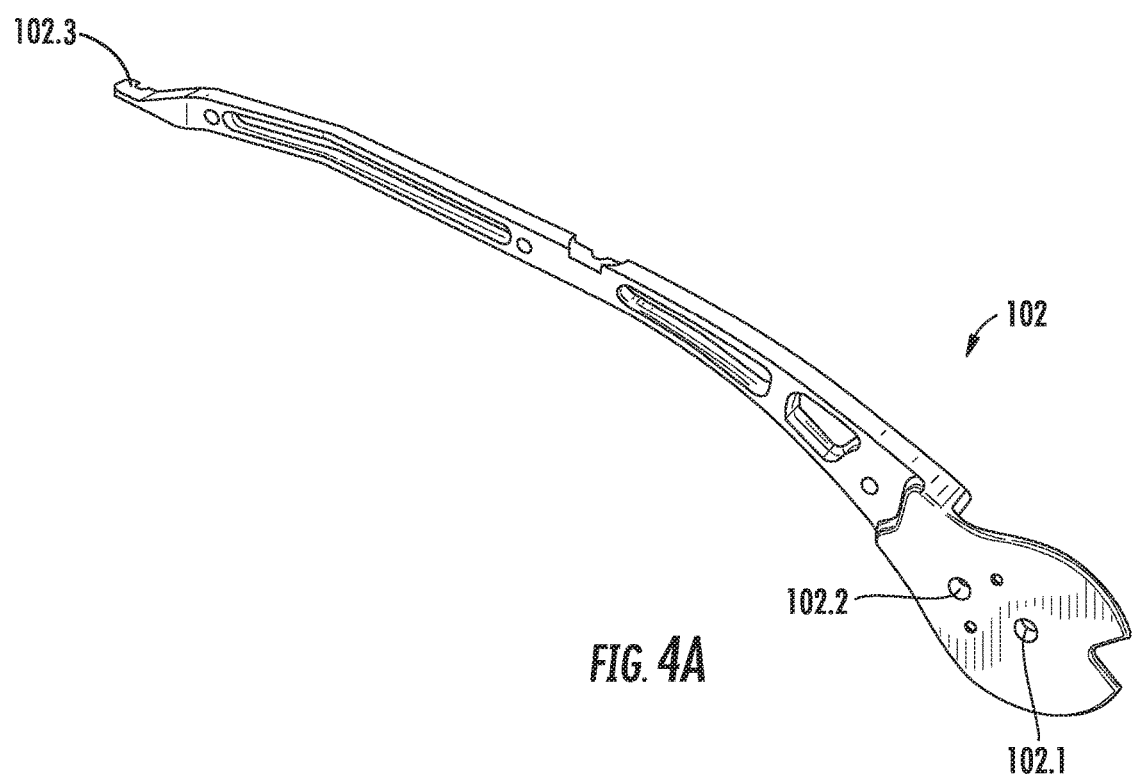
FIGS. 4A and 4B are perspective views of a first armrest spine of the armrest assembly of FIG. 1.
Figure 4B:
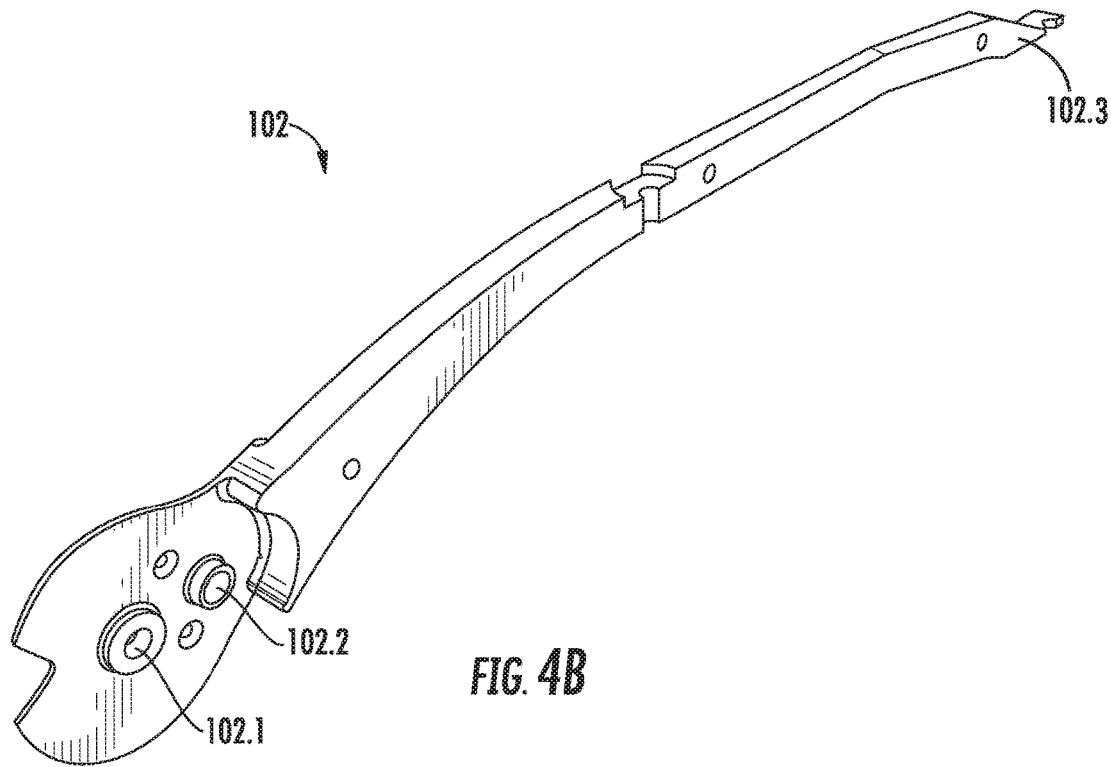
Figure 5:
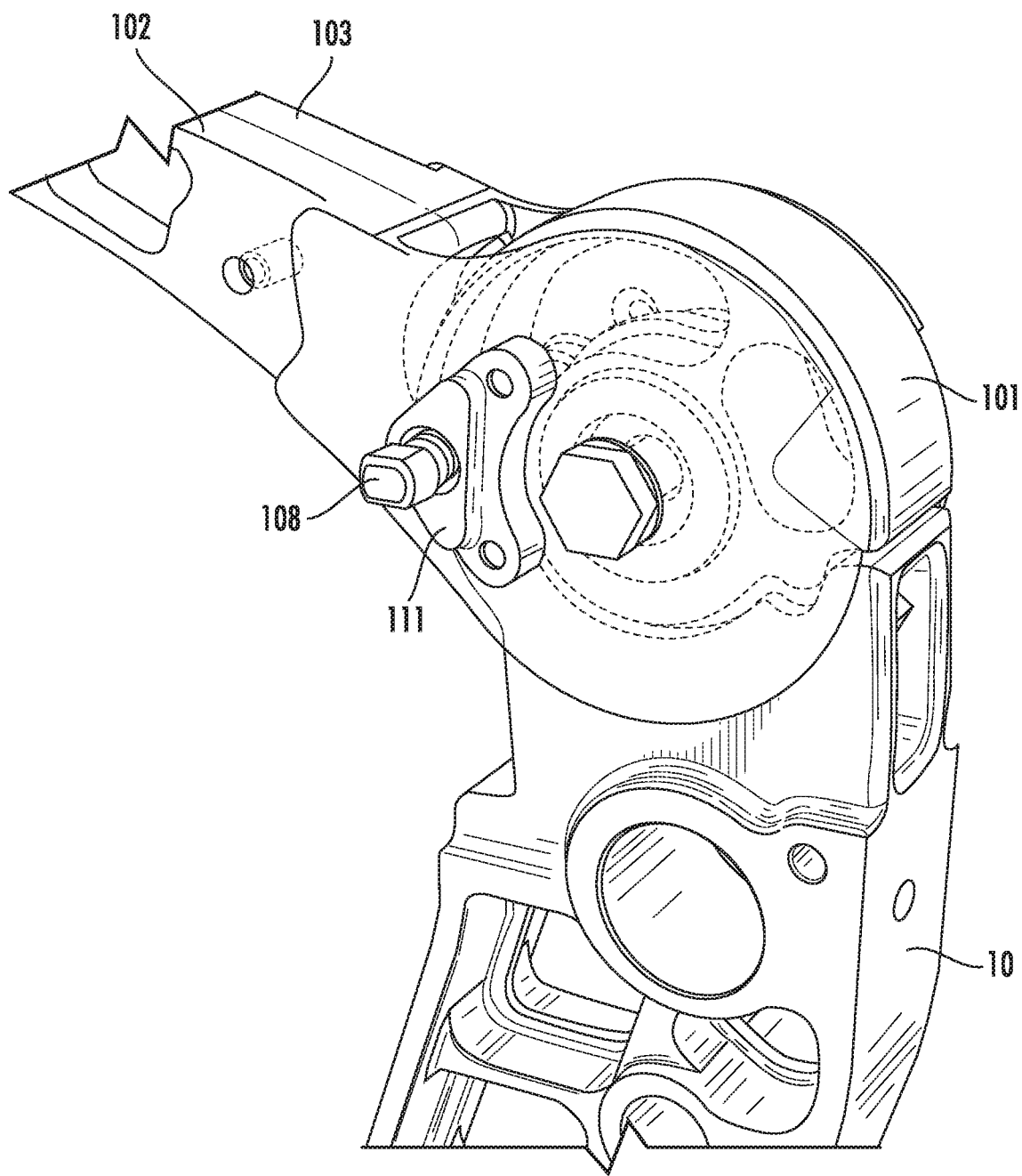
FIG. 5 is a detail partial perspective view of the armrest assembly of FIG. 1.

The arc slot 101.2 may interface with an armrest lock pin 110, which may be controlled with an armrest lock control 108. As shown in FIGS. 4A-5, an armrest lock housing 111 may secure the armrest lock control 108 and/or the armrest lock pin 110 to first armrest spine 102 such that the armrest lock pin 110 passes through hole 102.2 of the first armrest spine 102 (and through a similar hole in second armrest spine 103, which is not shown). The armrest lock pin 110 may include an increased diameter portion 110.1 and a reduced diameter portion 110.2 (see FIG. 9B). In some embodiments, the reduced diameter portion 110.2 approximately corresponds to the width W of the arc slot 101.2 while the increased diameter portion 110.1 approximately corresponds to the size of the enlarged portion 101.3. The spring 109 pushes the armrest lock pin 110 such that the increased diameter portion 110.1 will engage the enlarged portion 101.3 and lock the armrest in position based on the location of the enlarged portion 101.3. The armrest lock pin 110 may include an additional portion 110.3 that is larger than the enlarged portion 101.3 to act as a stop to prevent the spring 109 from moving the armrest lock pin 110 beyond the arc slot 101.2. To disengage the armrest lock pin 110 from the enlarged portion 101.3, the passenger must engage the armrest lock control 108 (e.g., pushing against spring 109), which aligns reduced diameter portion 110.2 with arc slot 101.2 and allows the armrest to rotate relative to pivot member 101 (i.e., armrest lock pin 110 moves through arc slot 101.2).

Figure 6:
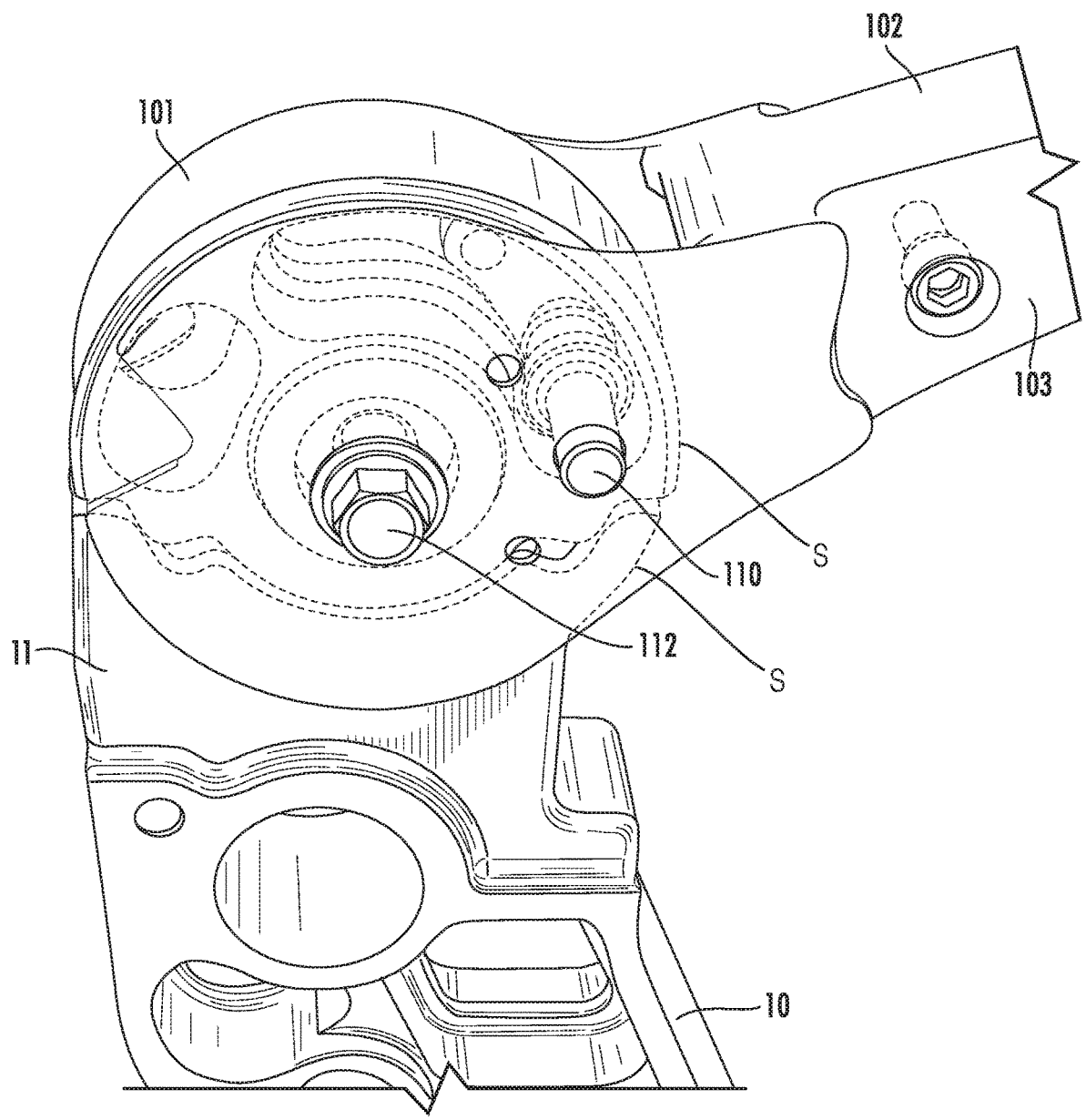
FIG. 6 is a detail partial perspective view of the armrest assembly of FIG. 1.
Figure 7:
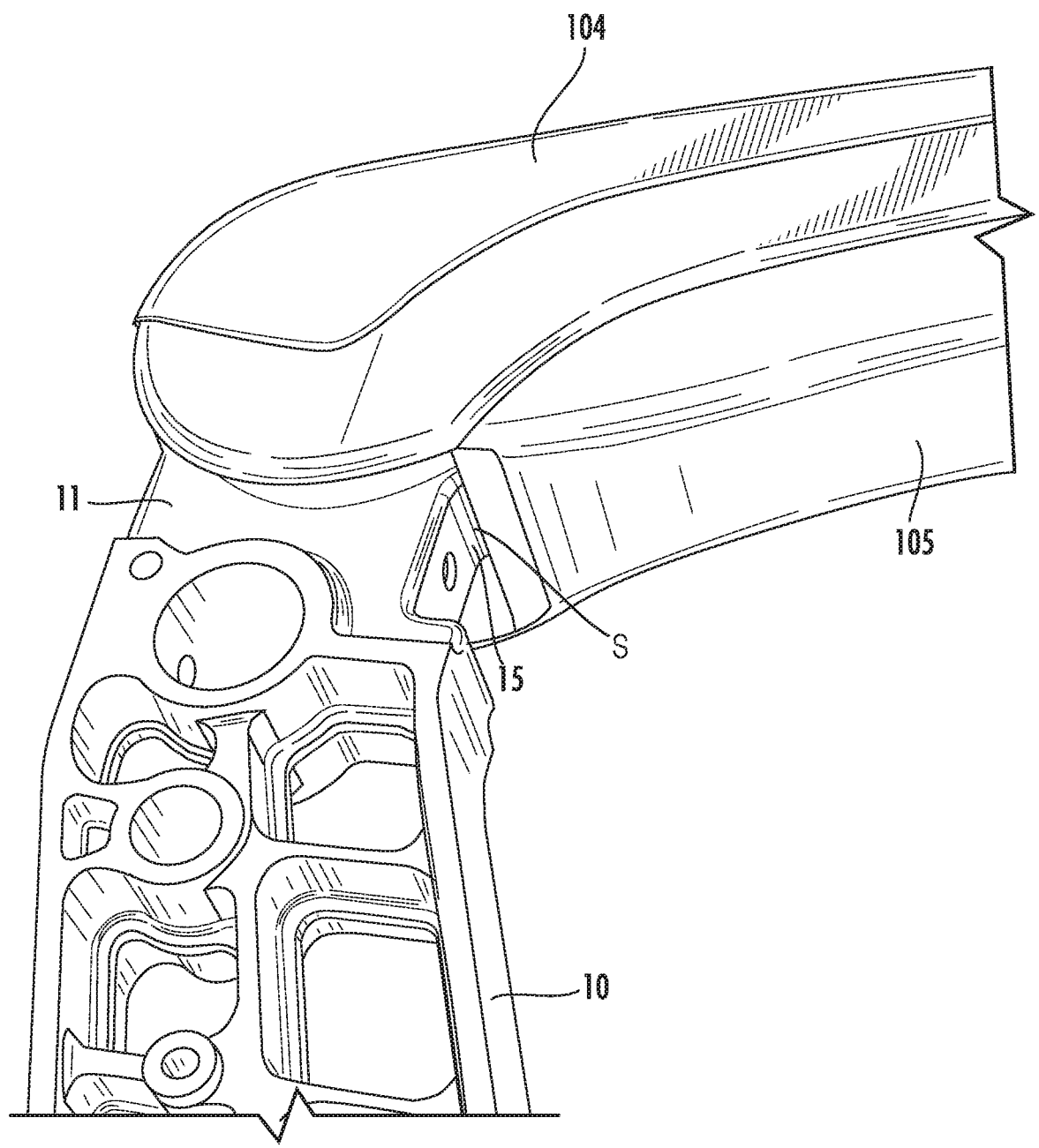
FIG. 7 is a detail partial perspective view of the armrest assembly of FIG. 1.

As shown in FIGS. 6 and 7, the upper attachment portion 11 of the seat frame 10 and the pivot member 101 form an approximately continuous circular or cylindrical surface S. Because the armrest rotates about center hole 101.1 of the pivot member 101, the gap 15 between the movable portion of armrest and surface S remains constant throughout the range of motion of the armrest.

The embodiments shown in FIGS. 1-9B may be appropriate for the aisle side of a seat where the armrest needs to lock in at least one position.

Figure 10A:
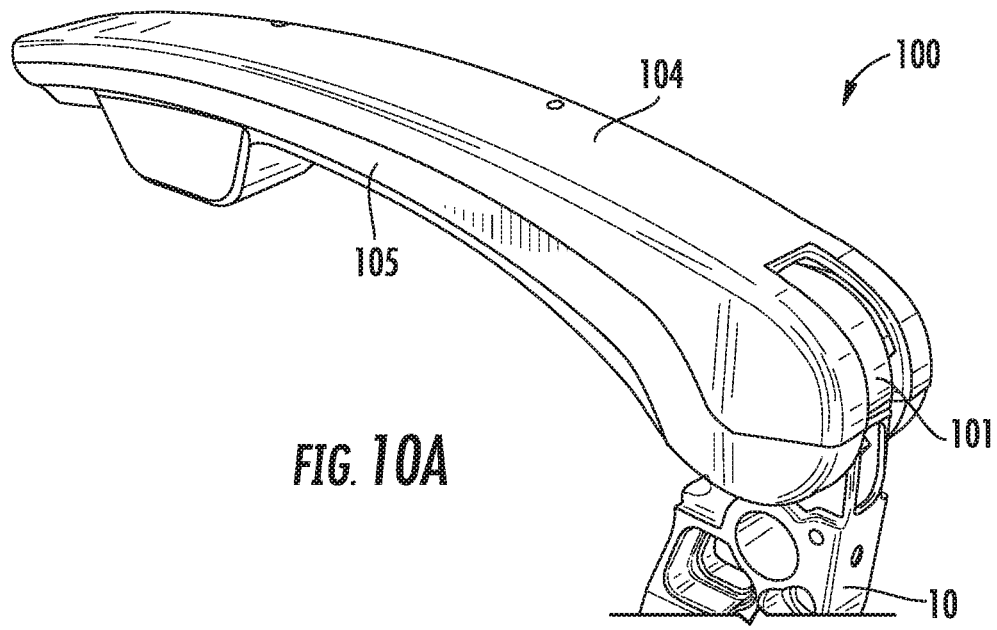
FIG. 10A is a perspective view of an armrest assembly according to certain embodiments of the present invention.
Figure 10B:
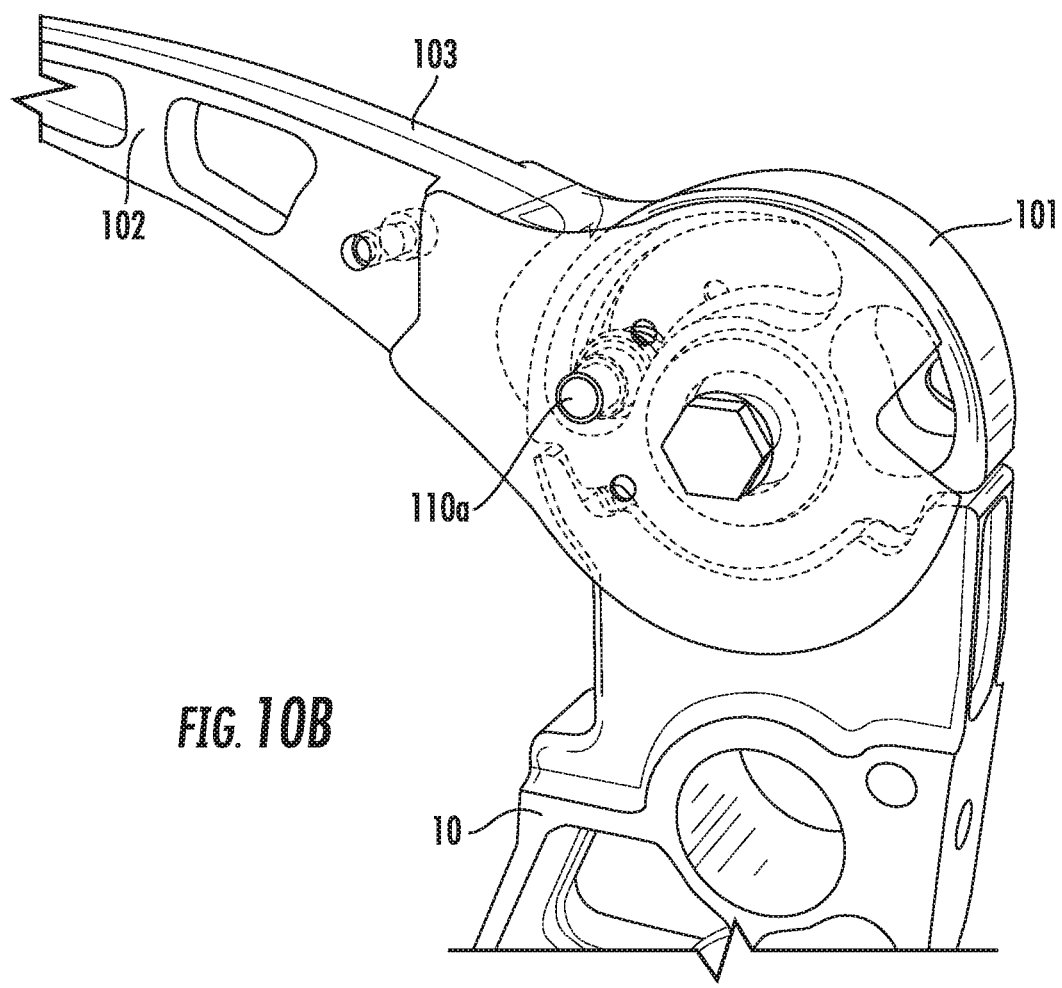
FIG. 10B is a detail partial perspective view of the armrest assembly of FIG. 10A.

In some embodiments, the armrest assembly 100 includes a non-movable armrest that remains in the deployed position where the armrest assembly 100 does not include an armrest lock control 108, an armrest lock housing 111, or a spring 109. As shown in FIGS. 10A and 10B, such embodiments include a static armrest lock pin 110a that is not designed to move after installation. In some embodiments, an armrest assembly 100, which is designed to be static, uses the same pivot member 101 as described above such that the static armrest lock pin 110a is arranged to exclusively engage the enlarged portion 101.3 of the arc slot 101.2. The static armrest lock pin 110a may be similar to armrest lock pin 110 (where the increased diameter portion 110.1 is configured to engage the enlarged portion 101.3 of the arc slot 101.2). In some embodiments, the static armrest lock pin 110a may be designed (i) with a central portion that engages the enlarged portion 101.3 and outer portions with smaller diameters for engaging the first and second armrest spines 102, 103 or (ii) with a constant diameter along its length (that approximately corresponds to the size of the enlarged portion 101.3). Because the static armrest lock pin 110a is not designed to move after installation, the additional portion 110.3 is not necessary.

The embodiments shown in FIGS. 10A-10B may be appropriate for the window side of a seat where the armrest should not move from the deployed position.

Figure 11A:
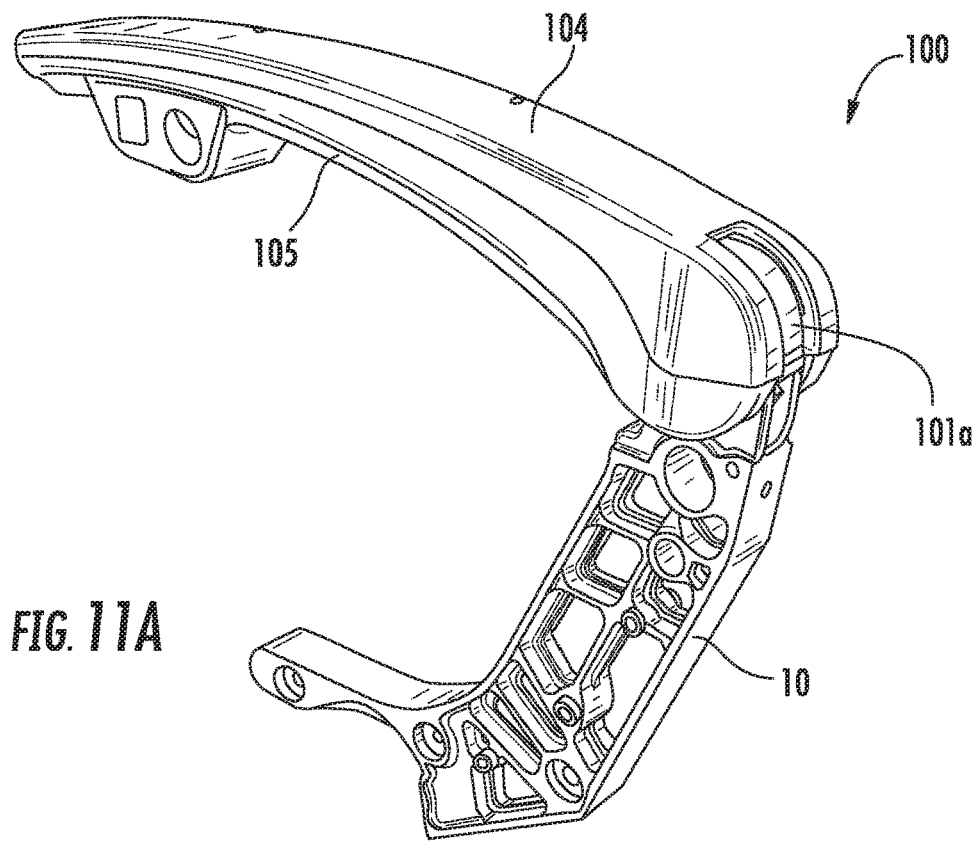
FIG. 11A is a perspective view of an armrest assembly according to certain embodiments of the present invention.
Figure 11B:
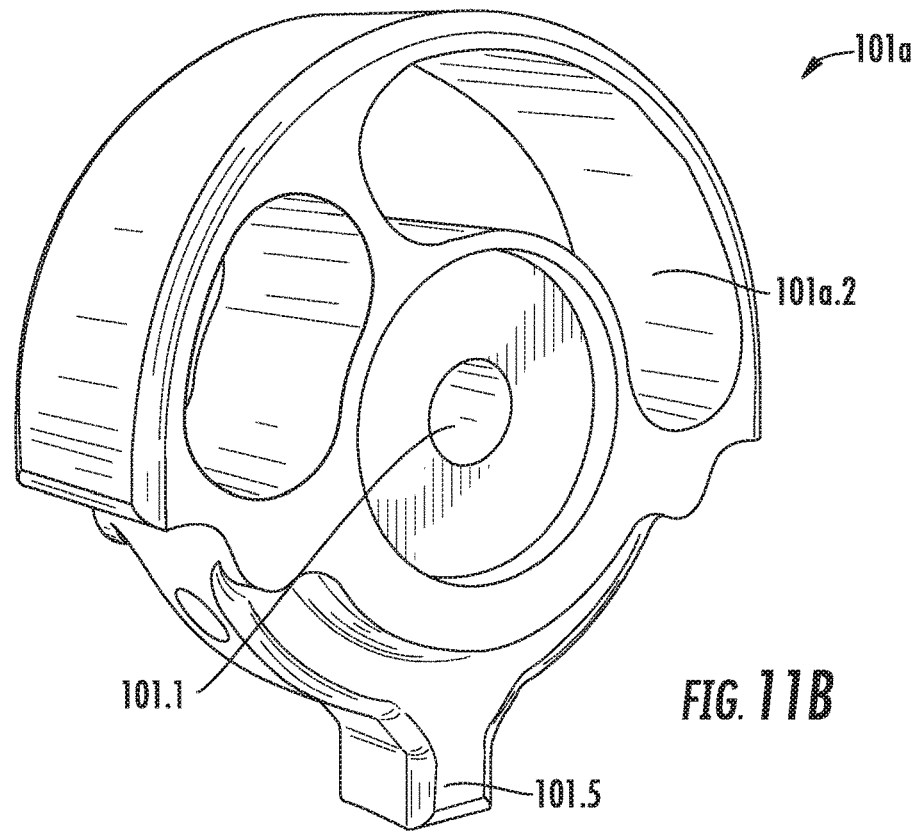
FIG. 11B is a perspective view of a pivot member of the armrest assembly of FIG. 11A.
Figure 12:
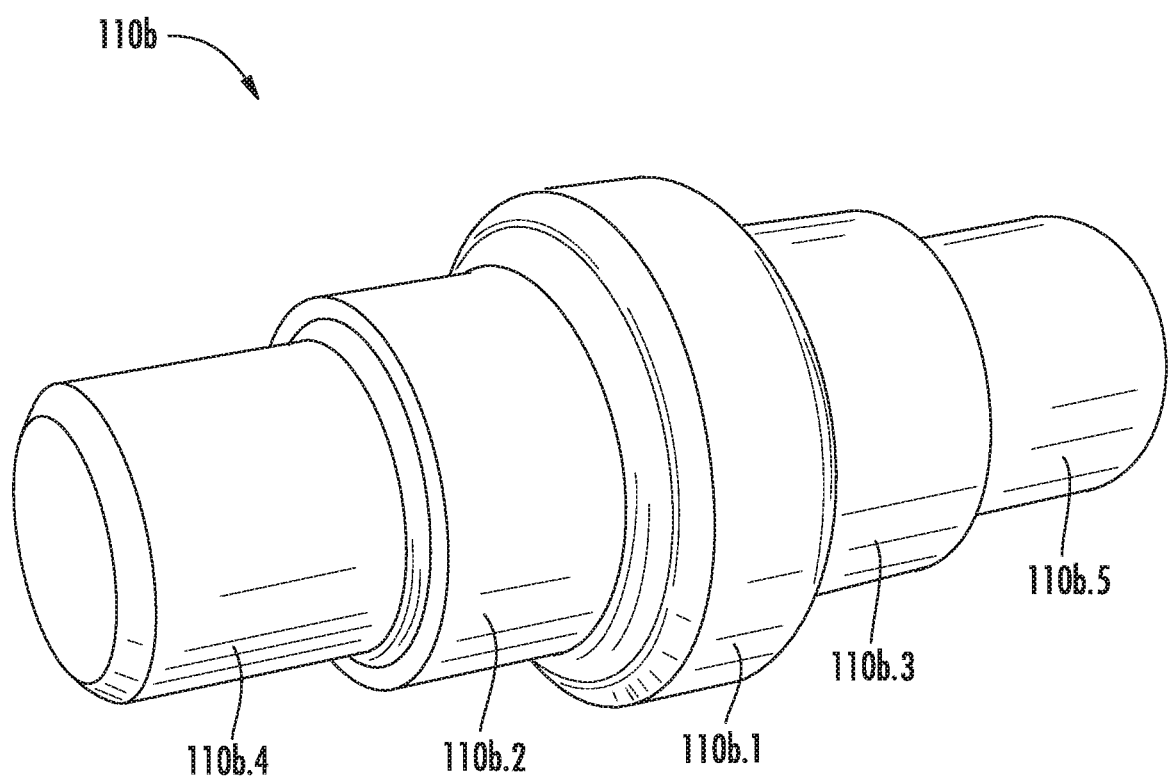
FIG. 12 is a perspective view of a non-locking armrest pin of the armrest assembly of FIG. 11A.

As shown in FIGS. 11A-12, in certain embodiments, the armrest assembly 100 includes a movable armrest that does not lock in any particular position where the armrest assembly 100 does not include an armrest lock control 108, an armrest lock housing 111, or a spring 109. Such embodiments may include a pivot member 101a and a non-locking armrest pin 110b. The pivot member 101a may include an arc slot 101a.2 with a constant size along its length (i.e., does not include an enlarged portion 101.3). The non-locking armrest pin 110b may include a middle portion 110b.1 that approximately corresponds to the width of the arc slot 101a.2 (see FIG. 11B). The non-locking armrest pin 110b may include intermediate portions 110b.2, 110b.3 and outer portions 110b.4, 110b.5 with smaller diameters for engaging the first and second armrest spines 102, 103.

The embodiments shown in FIGS. 11A-12 may be appropriate for a side of a seat that is adjacent to another seat where the armrest should not be constrained from movement.

Figure 13:
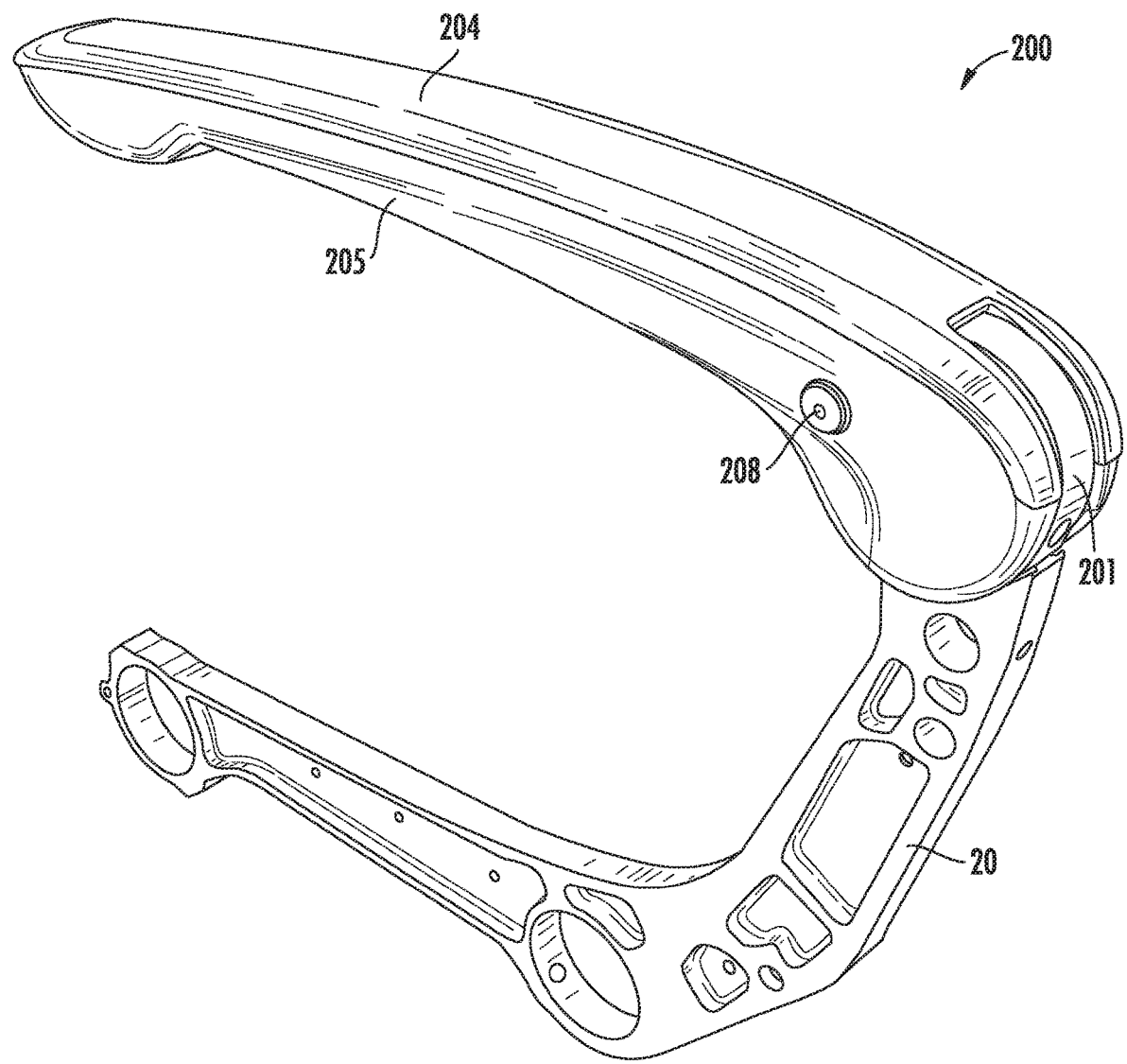
FIG. 13 is a perspective view of an armrest assembly according to certain embodiments of the present invention.

FIG. 13 shows an armrest assembly 200 in a deployed position and attached to a seat frame 20. The armrest assembly 200 may include at least one armrest cover. As one example, armrest assembly 200 may include an upper armrest cover 204 and a lower armrest cover 205 while, in other embodiments, the armrest assembly 200 may include a single armrest cover. The armrest assembly 200 may also include an armrest lock control 208 and a pivot member 201 that is located at an interface with the seat frame 20. The pivot member 201 includes a recess 201.5 such that the upper attachment portion 21 of the seat frame 20 may be inserted into the recess 201.5.

Figure 14:
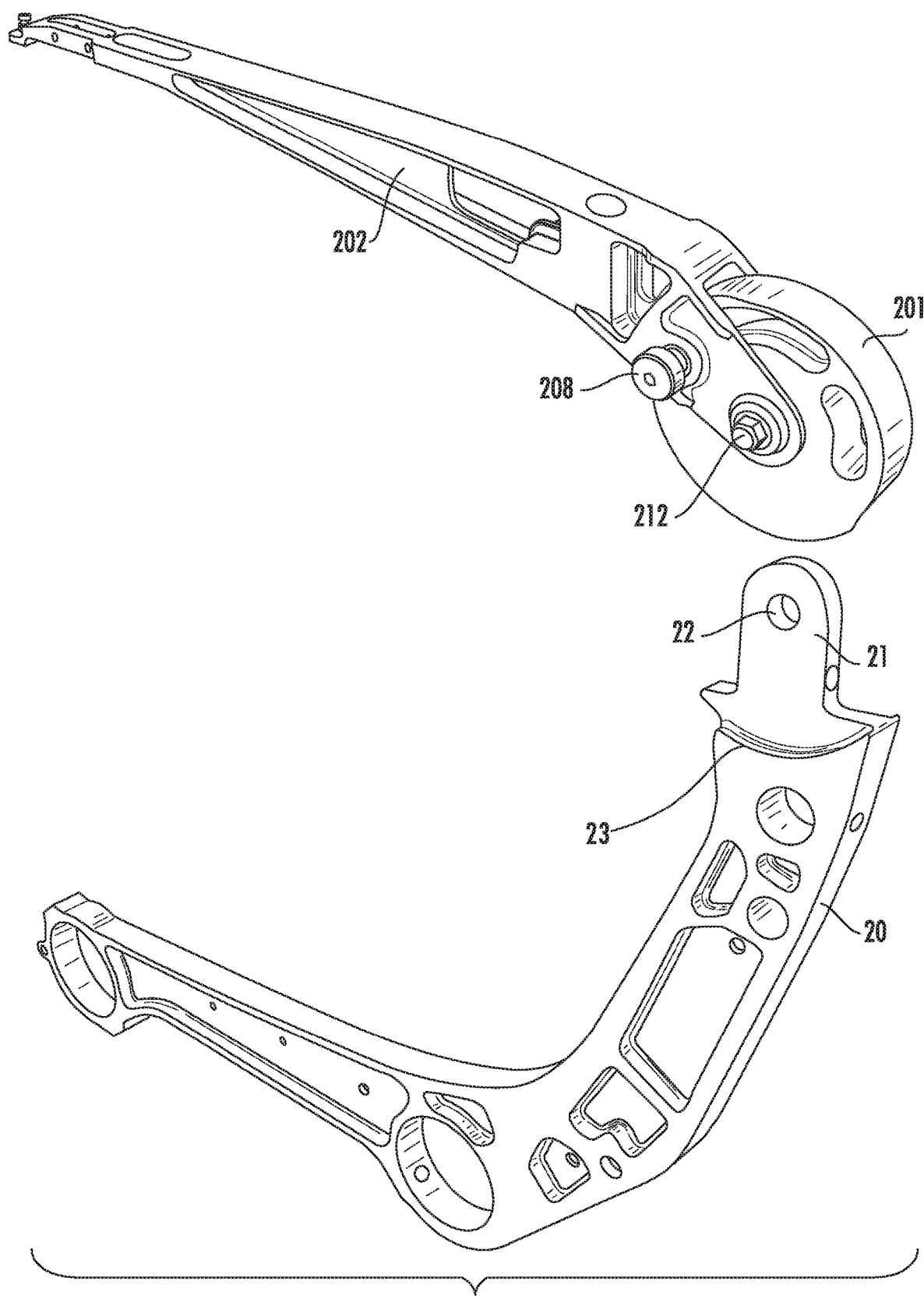
FIG. 14 is a partial perspective exploded view of the armrest assembly of FIG. 13.

The upper armrest cover 204 and the lower armrest cover 205 are not shown in FIG. 14, which shows an exploded view of the armrest assembly 200. The pivot member 201 is attached to armrest spine 202 that extends from the pivot member 201 to a distal end of the assembly (e.g., see distal end 202.3 of armrest spine 202 in FIGS. 16A and 16B). In addition to forming the primary structural member to support loads related to passengers leaning or pushing on the armrest, the armrest spine 202 facilitates attachment of the upper armrest cover 204 and the lower armrest cover 205. The armrest spine 202 is attached to the pivot member 201 via pivot fastener 212 (through center hole 201.1) such that the armrest spine 202 can rotate relative to the pivot member 201. The pivot fastener 212 also passes through hole 22 of the upper attachment portion 21 of the seat frame 20. The seat frame 20 includes a rounded shoulder 23 that approximately matches the contour of the lower surface of the pivot member 201 (adjacent to recess 201.5).

Figures 15A, 15B, 15C:
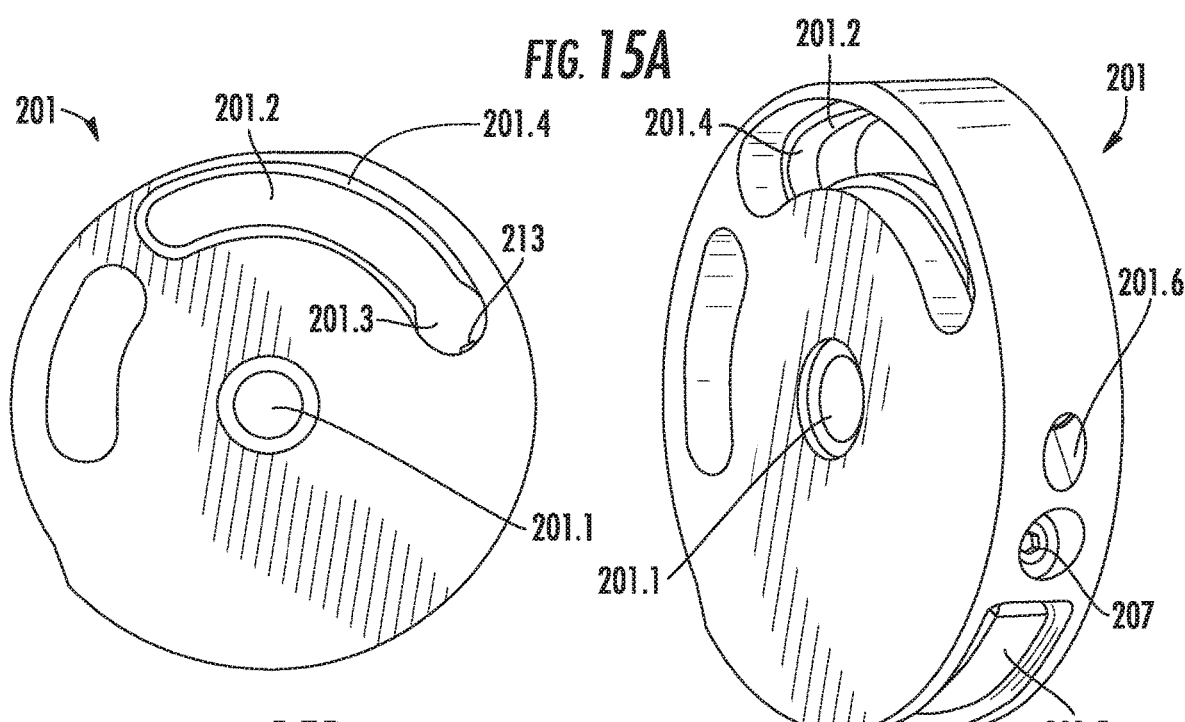
FIG. 15A is a perspective view of a pivot member of the armrest assembly of FIG. 13.
FIG. 15B is a side view of a pivot member of the armrest assembly of FIG. 13.
FIG. 15C is a perspective view of a pivot member of the armrest assembly of FIG. 13.

The pivot member 201 may also include threaded holes for set screws 206 and 207, which allow adjustment of the deployed and/or retracted positions of the armrest (see FIGS. 15A-15C). To adjust the pivot member 201 relative to the seat frame 20, the front set screw 207 is tightened against the upper attachment portion 21 of the seat frame 20 (see FIG. 15C), which will cause the distal end of the armrest (e.g., distal end 202.3 of armrest spine 202) to move up. The rear set screw 206 can be tightened against the upper attachment portion 21, which will cause the distal end of the armrest (e.g., distal end 202.3 of the armrest spine 202) to move down.

As shown in FIGS. 15A-15C, the pivot member 201 includes an arc slot 201.2, which is centered about center hole 201.1. The arc slot 201.2 is arranged such that a pin attached to the armrest spine 202 (e.g., armrest lock pin 210, described below) travels along the length of the arc slot 201.2 when the armrest spine 202 rotates relative to the pivot member 201. The ends of arc slot 201.2 may define limits for rotation of the armrest (i.e., deployed and retracted positions of the armrest). In some embodiments, the arc slot 201.2 includes at least one enlarged portion (such as enlarged portion 201.3), which has a larger width than the arc slot 201.2. In some embodiments, a rib 201.4 within the arc slot 201.2 defines the width (i.e., some or all of rib 201.4 is removed at the location of the at least one enlarged portion). Although the drawings illustrate a single enlarged portion, the arc slot 201.2 may include an enlarged portion at each end of the arc slot 201.2 (corresponding to the deployed and retracted positions of the armrest) and/or may include at least one intermediate enlarged portion between the ends of the slot.

Figure 16A:
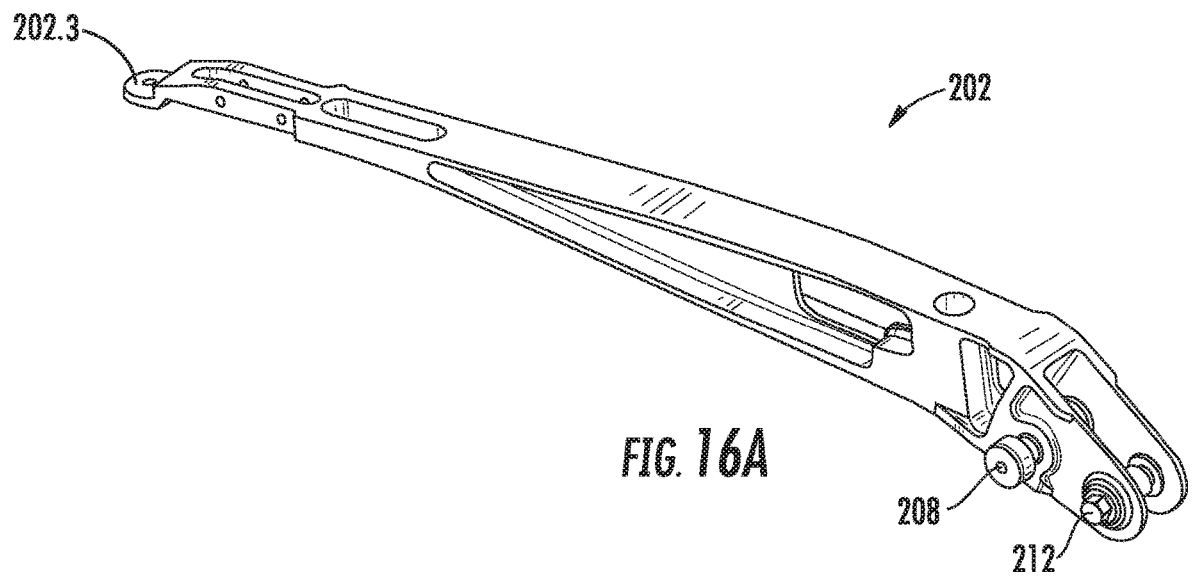
FIGS. 16A and 16B are perspective views of an armrest spine of the armrest assembly of FIG. 13.
Figure 16B:
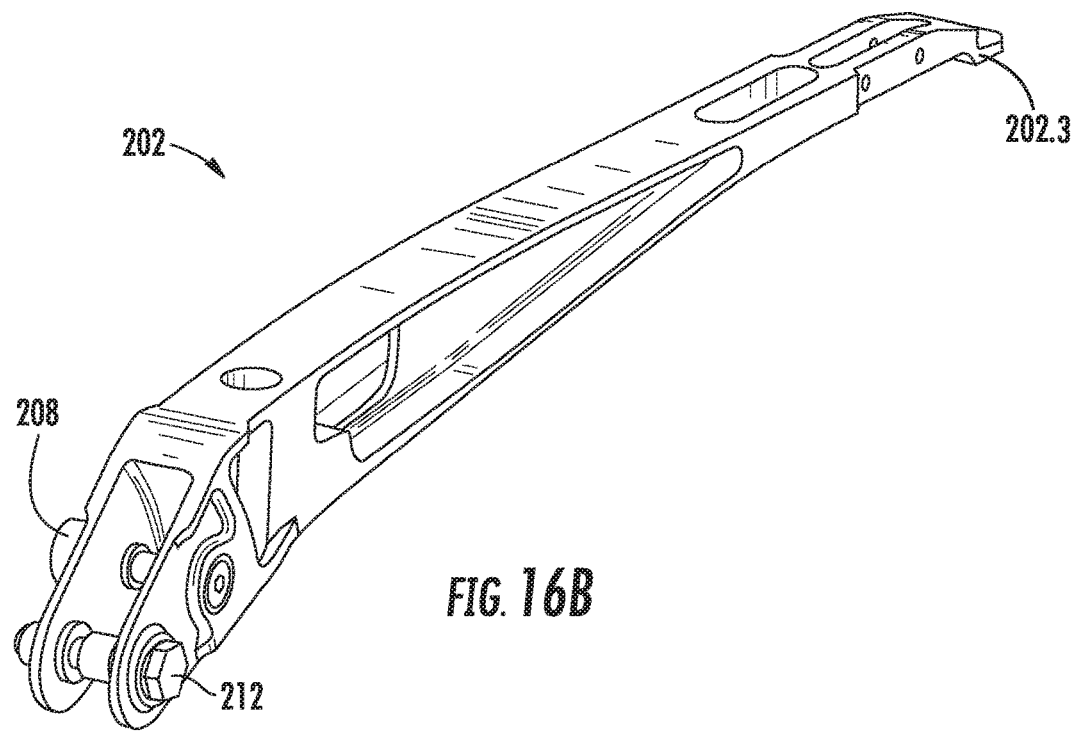
Figure 17:
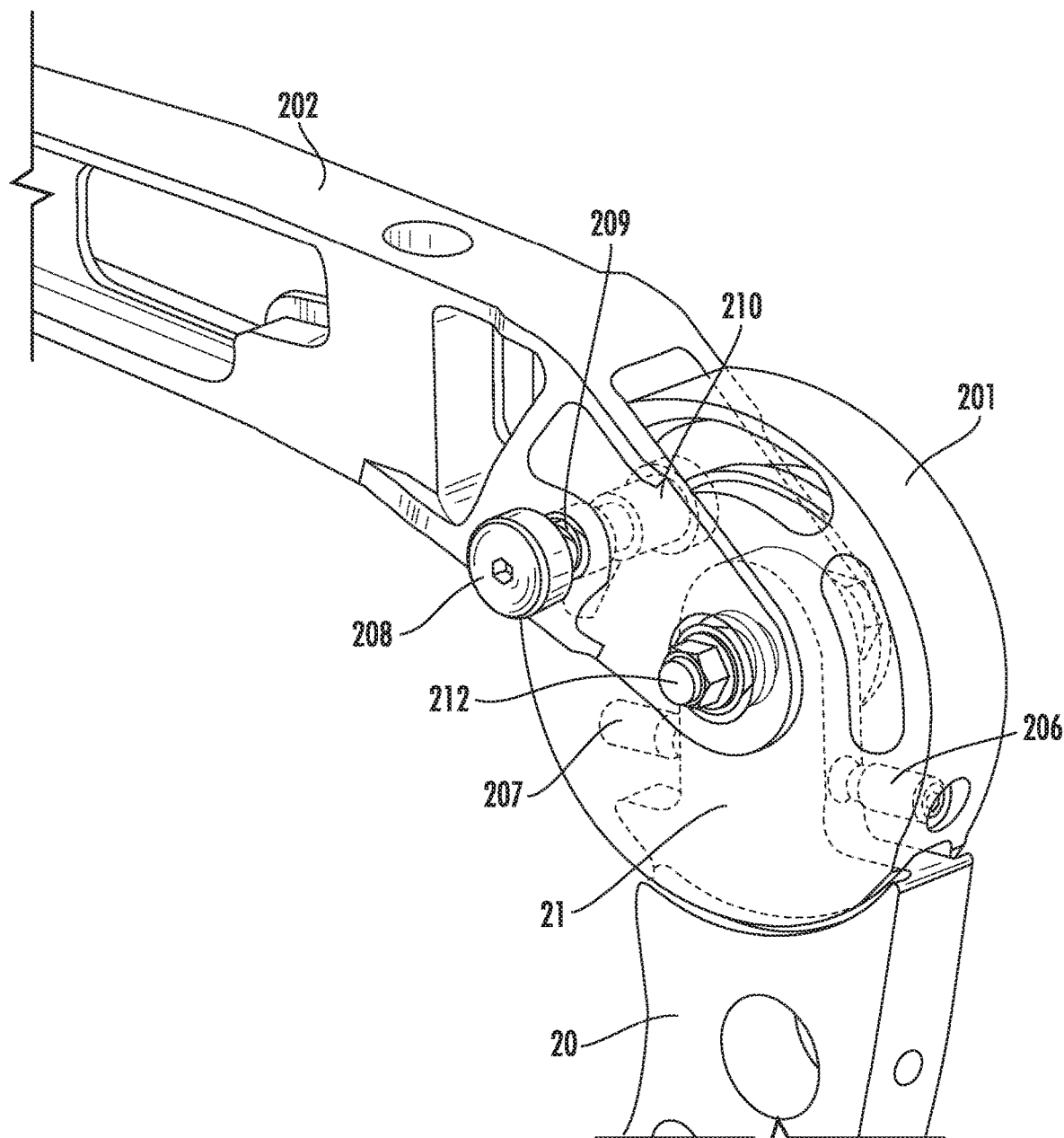
FIG. 17 is a detail partial perspective view of the armrest assembly of FIG. 13.

The arc slot 201.2 may interface with an armrest lock pin 210, which may be controlled with an armrest lock control 208. As shown in FIGS. 16A-17, the armrest lock control 208 and/or the armrest lock pin 210 may be secured to the armrest spine 202 such that the armrest lock pin 210 passes through a hole of the armrest spine 202. The armrest lock pin 210 may include an increased diameter portion 210.1 and a reduced diameter portion 210.2 (see FIG. 19A). In some embodiments, the reduced diameter portion 210.2 approximately corresponds to the width of the arc slot 201.2 while the increased diameter portion 210.1 approximately corresponds to the size of the enlarged portion 201.3. The spring 209 pushes the armrest lock pin 210 such that the increased diameter portion 210.1 will engage the enlarged portion 201.3 and lock the armrest in position based on the location of the enlarged portion 201.3. To disengage the armrest lock pin 210 from the enlarged portion 201.3, the passenger must engage the armrest lock control 208 (e.g., pushing against spring 209), which aligns reduced diameter portion 210.2 with arc slot 201.2 and allows the armrest to rotate relative to pivot member 201 (i.e., armrest lock pin 210 moves through arc slot 201.2). The armrest lock pin 210 may include a first bushing 216 (installed on a first side of the armrest spine 202) and a second bushing 217 (installed on a second side of the armrest spine 202).

In some embodiments, the pivot member 201 may include a set screw 213 within threaded hole 201.6 (see FIGS. 15B-15C) such that the end of the set screw 213 extends into the enlarged portion 201.3 for ensuring a tight fit to limit vibration when increased diameter portion 210.1 engages the enlarged portion 201.3.

Figure 18:
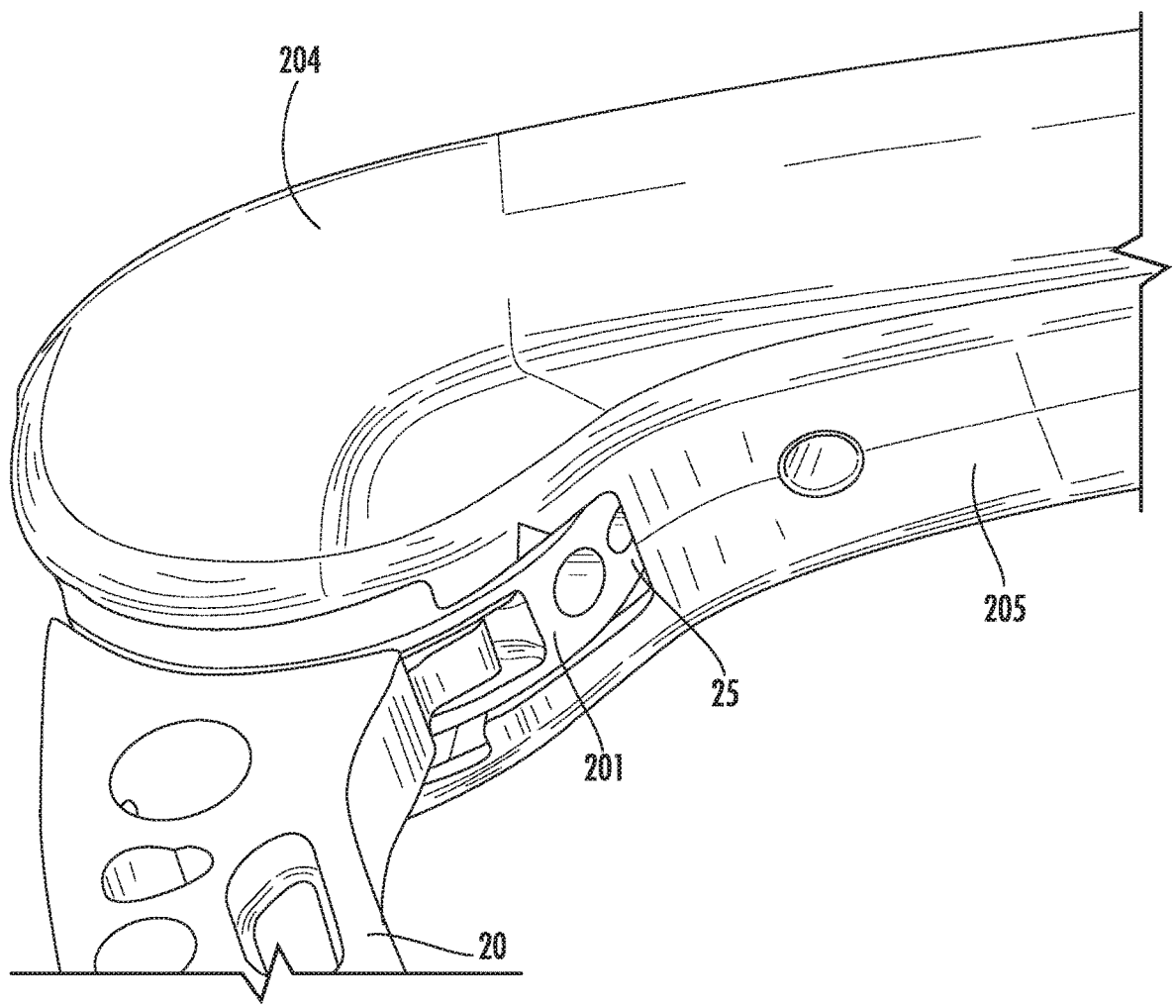
FIG. 18 is a detail partial perspective view of the armrest assembly of FIG. 13.

As shown in FIG. 18, the pivot member 201 forms an approximately circular or cylindrical surface. Because the armrest rotates about center hole 201.1 of the pivot member 201, the gap 25 between the movable portion of armrest and the surface of the pivot member 201 remains constant throughout the range of motion of the armrest (similar to gap 15 shown in FIG. 7).

The embodiments shown in FIGS. 13-19A may be appropriate for the aisle side of a seat where the armrest needs to lock in at least one position.

Figure 19A:
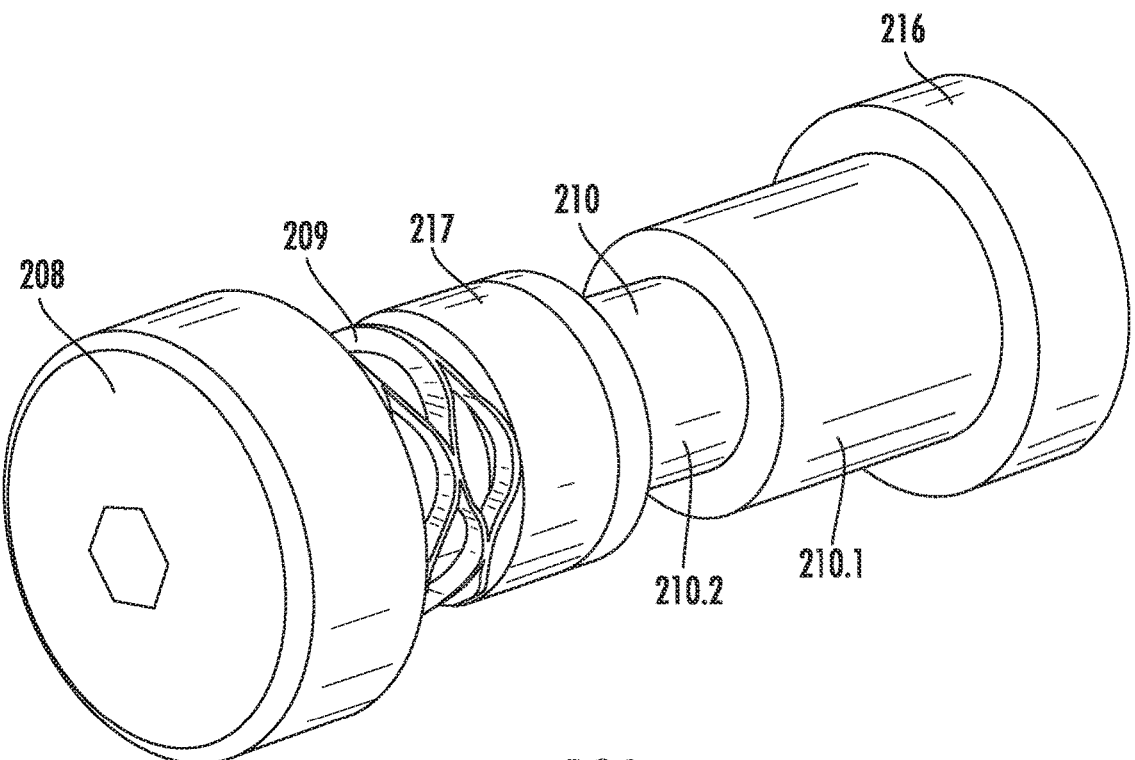
FIG. 19A is a perspective view of an armrest lock pin of the armrest assembly of FIG. 13.
Figure 19B:
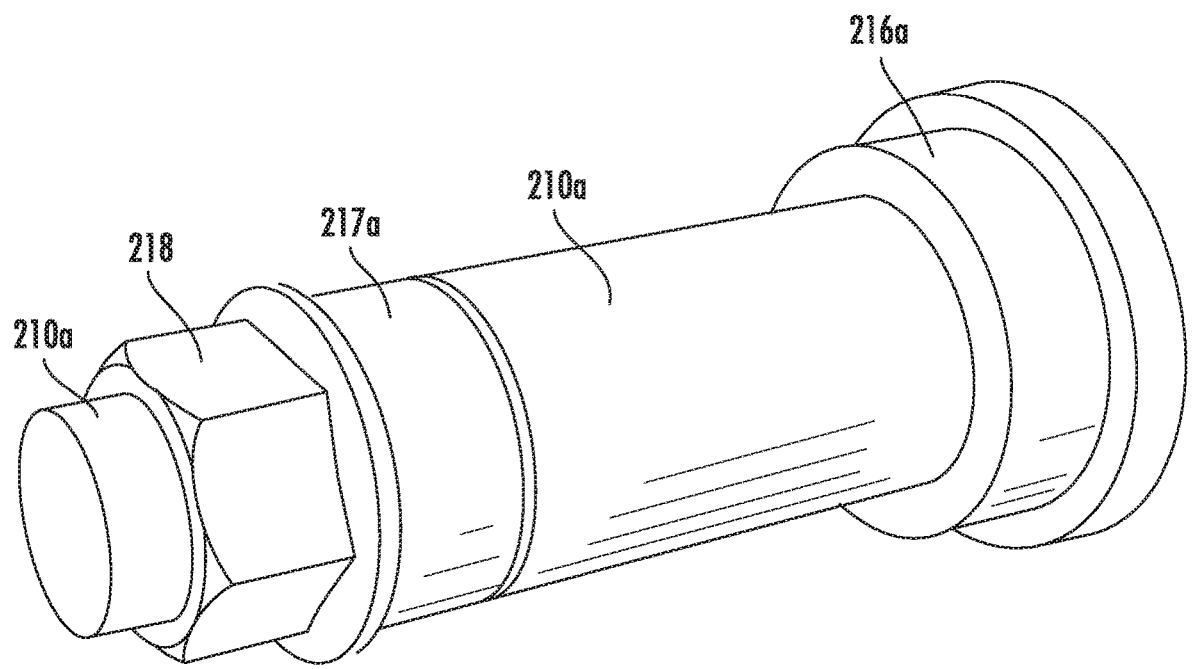
FIG. 19B is a perspective view of a static armrest lock pin of the armrest assembly of FIG. 13.

In some embodiments, the armrest assembly 200 includes a non-movable armrest that remains in the deployed position where the armrest assembly 200 does not include an armrest lock control 208 or a spring 209. As shown in FIG. 19B, such embodiments include a static armrest lock pin 210a that is not designed to move after installation. In some embodiments, an armrest assembly 200, which is designed to be static, uses the same pivot member 201 as described above such that the static armrest lock pin 210a is arranged to exclusively engage the enlarged portion 201.3 of the arc slot 201.2. As shown in FIG. 19B, the static armrest lock pin 210a may include a constant diameter along its length between a first bushing 216a (installed on a first side of the armrest spine 202), a second bushing 217a (installed on a second side of the armrest spine 202), and a nut 218 to lock the pin 210a in position. The diameter of the static armrest lock pin 210a between the two bushings may approximately correspond to the enlarged portion 201.3 of the arc slot 201.2. Although not illustrated in the drawings, in some embodiments, a static armrest lock pin may be similar to armrest lock pin 210 (where the first cylindrical portion 210.1 is configured to engage the enlarged portion 201.3 of the arc slot 201.2) but without the armrest lock control 208 or the spring 209.

The embodiments shown in FIG. 19B may be appropriate for the window side of a seat where the armrest should not move from the deployed position.

As shown in FIGS. 20A-20C, in certain embodiments, the armrest assembly 200 includes a movable armrest that does not lock in any particular position where the armrest assembly 200 does not include an armrest lock control 208 or a spring 209. Such embodiments may include a pivot member 201a and a non-locking armrest pin. The pivot member 201a may include an arc slot 201a.2 with a constant size along its length (i.e., does not include an enlarged portion 201.3). The non-locking armrest pin may be similar to static armrest lock pin 210a with a constant diameter along its length between bushings installed in the armrest spine 202. In such embodiments, the size of the non-locking armrest pin approximately corresponds to the size of the arc slot 201a.2 such that the non-locking armrest pin may move unconstrained along the full length of the arc slot 201a.2.

The embodiments shown in FIGS. 20A-20C may be appropriate for a side of a seat that is adjacent to another seat where the armrest should not be constrained from movement.

Figure 21:
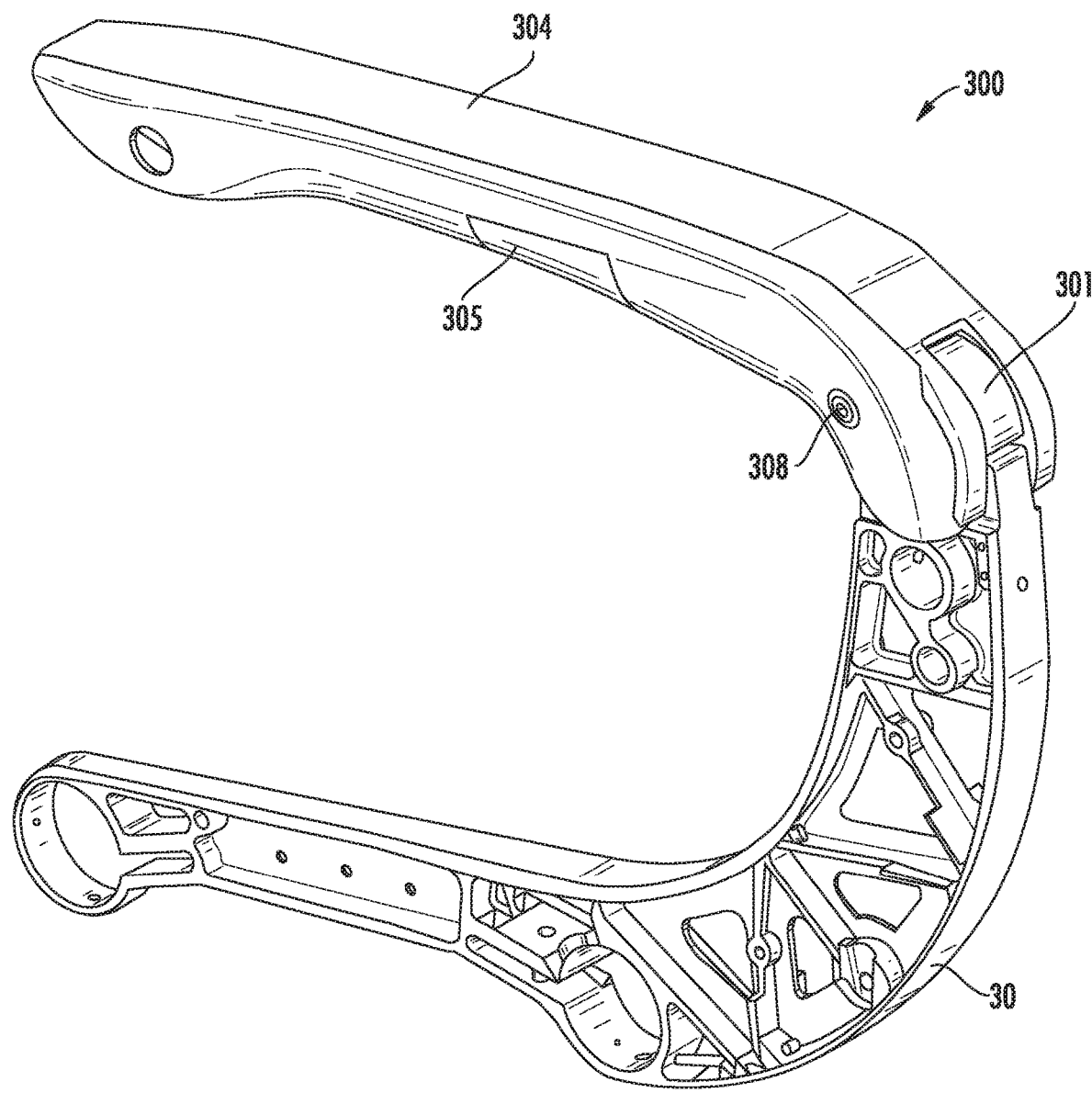
FIG. 21 is a perspective view of an armrest assembly according to certain embodiments of the present invention.

FIG. 21 shows an armrest assembly 300 in a deployed position and attached to a seat frame 30. The armrest assembly 300 may include at least one armrest cover. As one example, armrest assembly 300 may include an upper armrest cover 304 and a lower armrest cover 305 while, in other embodiments, the armrest assembly 300 may include a single armrest cover. The armrest assembly 300 may also include an armrest lock control 308 and a pivot member 301 that is located at an interface with the seat frame 30.

Figure 22:
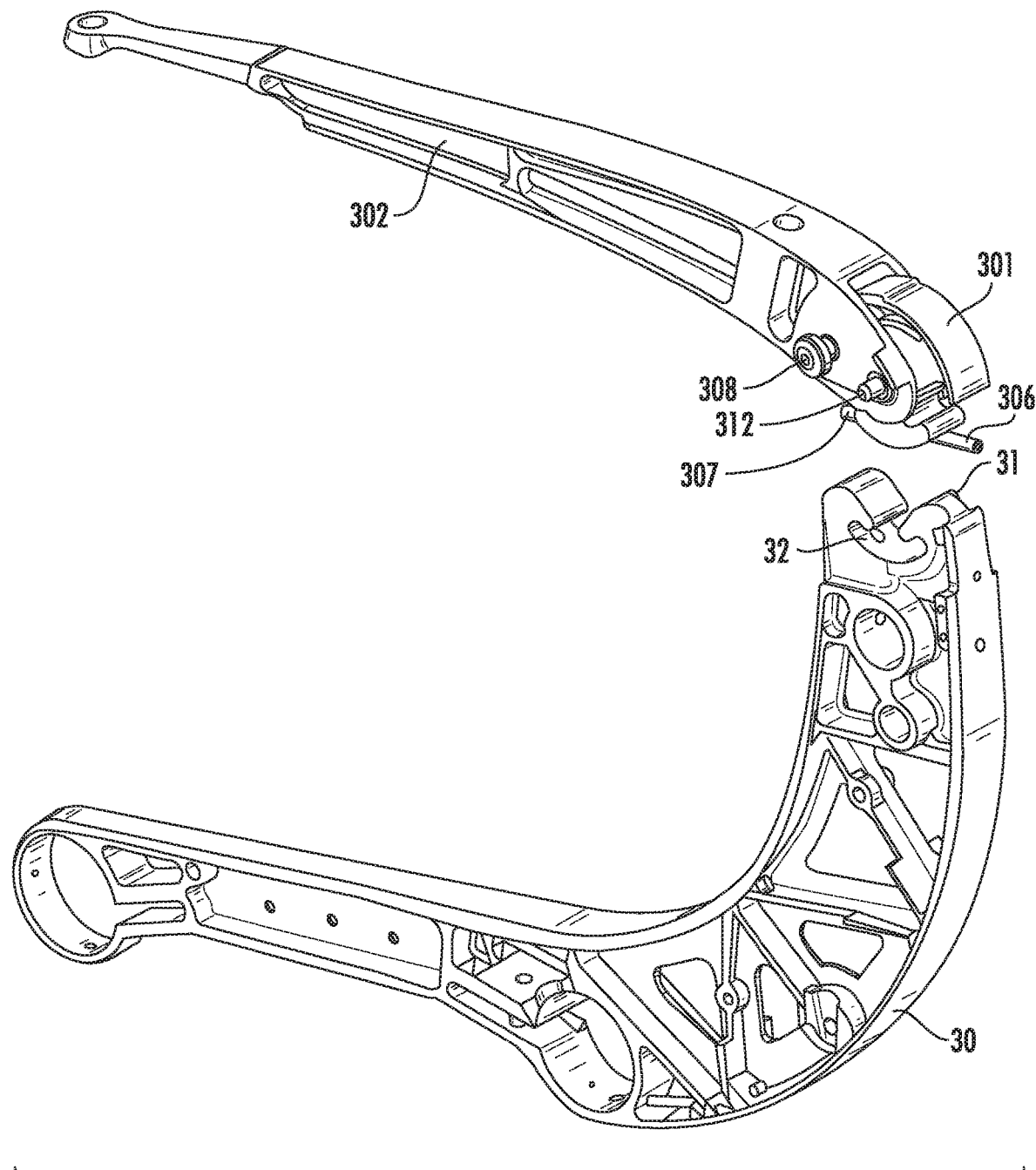
FIG. 22 is a partial perspective exploded view of the armrest assembly of FIG. 21.
Figure 23A:
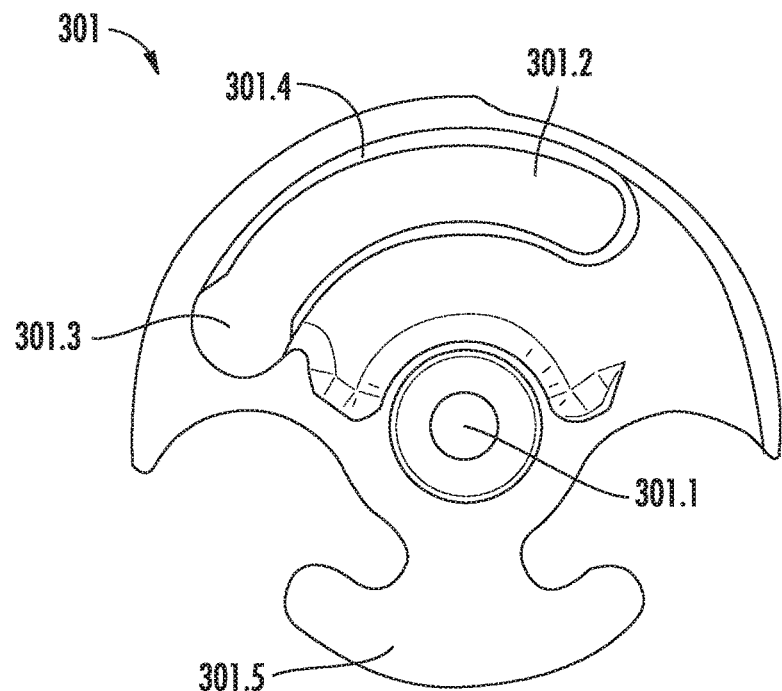
FIG. 23A is a side view of a pivot member of the armrest assembly of FIG. 21.
Figure 23B:
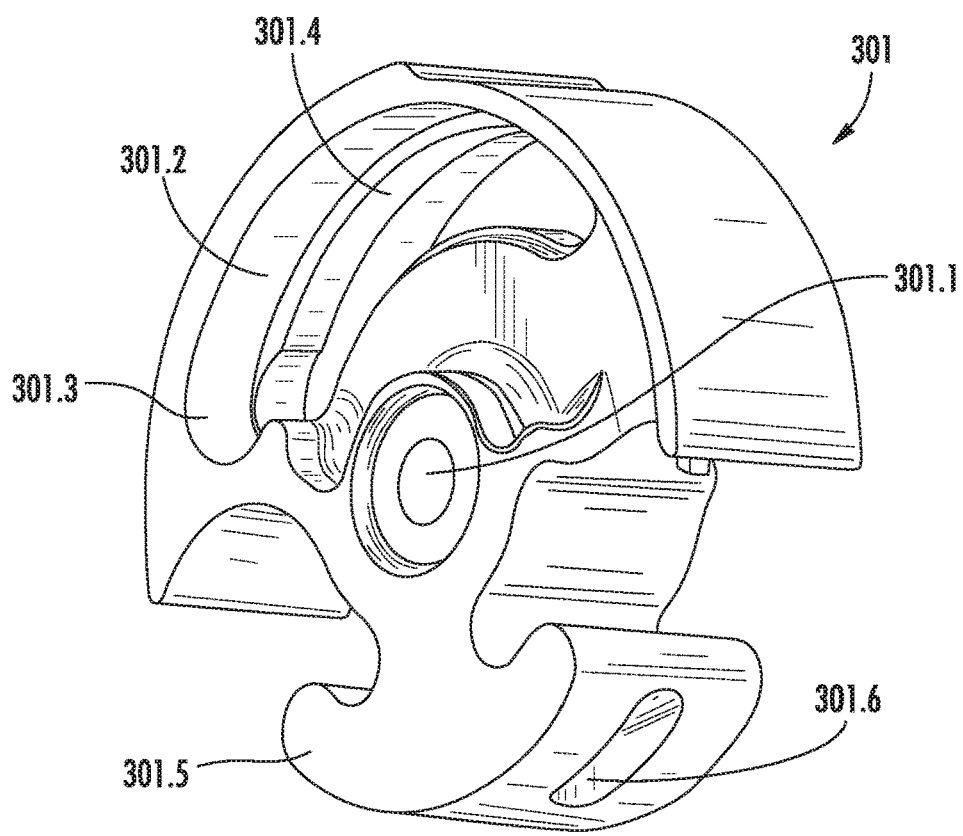
FIG. 23B is a perspective view of a pivot member of the armrest assembly of FIG. 21.
Figure 24A:
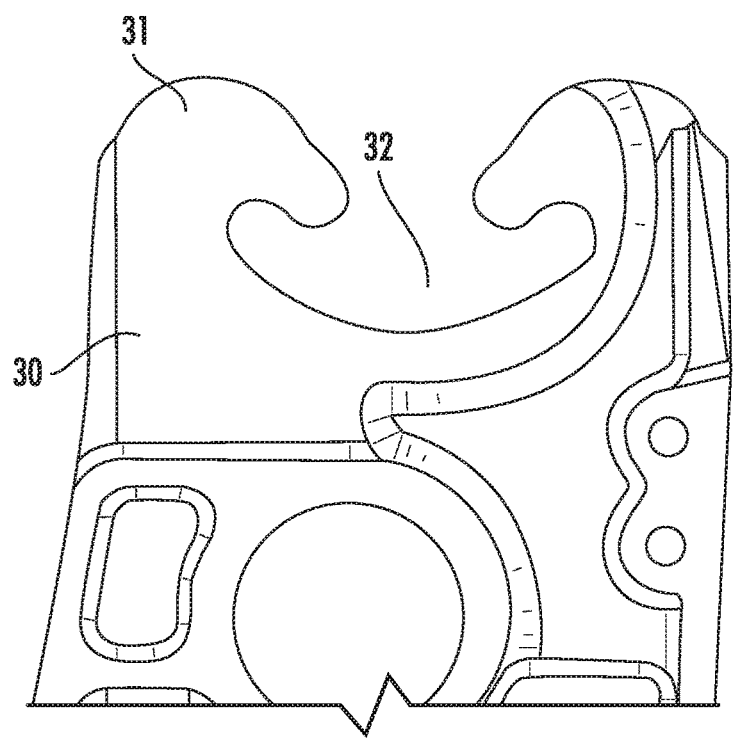
FIG. 24A is a side view of an upper portion of a seat frame for interfacing with the pivot member of FIG. 23A.
Figure 24B:
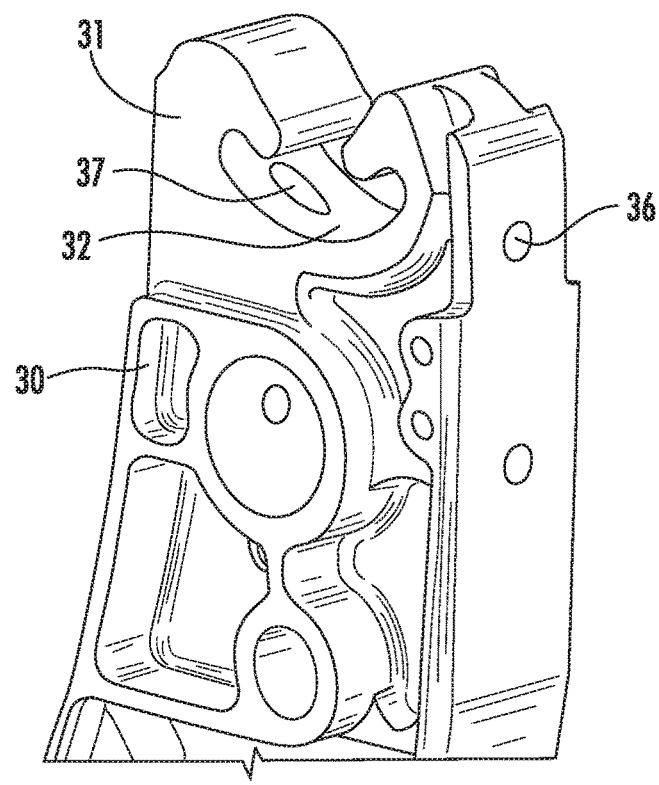
FIG. 24B is a perspective view of an upper portion of a seat frame for interfacing with the pivot member of FIG. 23A.

The upper armrest cover 304 and the lower armrest cover 305 are not shown in FIG. 22, which shows an exploded view of the armrest assembly 300. The pivot member 301 is attached to armrest spine 302 that extends from the pivot member 301 to a distal end of the assembly. In addition to forming the primary structural member to support loads related to passengers leaning or pushing on the armrest, the armrest spine 302 facilitates attachment of the upper armrest cover 304 and the lower armrest cover 305. The armrest spine 302 is attached to the pivot member 301 via pivot fastener 312 (through center hole 301.1) such that the armrest spine 302 can rotate relative to the pivot member 301. The pivot member 301 is attached to the upper attachment portion 31 of the seat frame 30. The upper attachment portion 31 may include a recess 32 for interfacing with a lower protrusion 301.5 of the pivot member 301 (see FIGS. 23A-24B). In some embodiments, the lower protrusion 301.5 of the pivot member 301 facilitates a mechanical attachment to the seat frame 30 (i.e., recess 32) that constrains movement in multiple directions. In FIGS. 23A-23B, the lower protrusion 301.5 has a curved "T" shape or an anchor shape while the recess 32 has a corresponding shape that is slightly larger than lower protrusion 301.5. Engagement of the lower protrusion 301.5 within the recess 32 constrains movement in the fore/aft and vertical directions, but does not constrain movement in the lateral direction (i.e., parallel to the axis of pivot fastener 312). However, as described below, lateral movement may be constrained using set screws 306, 307. The lower protrusion 301.5 and recess 32 may have any appropriate shape or cross section, such as, but not limited to a dovetail, rounded, rectangular, or any other appropriate shape.

The upper attachment portion 31 may also include threaded holes 36, 37 for set screws 306 and 307. The set screws 306, 307 may have multiple purposes including, for example, (1) allowing adjustment of the deployed and/or retracted positions of the armrest and (2) constraining movement of the pivot member 301 relative to the seat frame 30 in the lateral direction. To adjust the pivot member 301 relative to the seat frame 30, the rear set screw 306 is tightened against the lower protrusion 301.5 of the pivot member 301 (in particular, set screw 306 contacts an approximately flat surface within recess 301.6 as shown in FIG. 23B). Tightening set screw 306 causes the distal end of the armrest to move up. The front set screw 307 can be tightened against the lower protrusion 301.5 of the pivot member 301 (with a recess that is not shown but is similar to recess 301.6), which will cause the distal end of the armrest to move down.

As shown in FIGS. 23A and 23B, the pivot member 301 includes an arc slot 301.2, which is centered about center hole 301.1. The arc slot 301.2 is arranged such that a pin attached to the armrest spine 302 travels along the length of the arc slot 301.2 when the armrest spine 302 rotates relative to the pivot member 301. The ends of arc slot 301.2 may define limits for rotation of the armrest (i.e., deployed and retracted positions of the armrest). In some embodiments, the arc slot 301.2 includes at least one enlarged portion (such as enlarged portion 301.3), which has a larger width than the arc slot 301.2. In some embodiments, a rib 301.4 within the arc slot 301.2 defines the width (i.e., some or all of rib 301.4 is removed at the location of the at least one enlarged portion). Although the drawings illustrate a single enlarged portion, the arc slot 301.2 may include an enlarged portion at each end of the arc slot 301.2 (corresponding to the deployed and retracted positions of the armrest) and/or may include at least one intermediate enlarged portion between the ends of the slot.

The arc slot 301.2 may interface with an armrest pin, which may be controlled with an armrest lock control 308. The armrest pin for armrest assembly 300 may be similar to at least one of pins 110, 110*a*, 110*b*, 210, 210*a* described above. As shown in FIG. 22, the armrest lock control 308 (and/or the armrest pin) may be secured to the armrest spine 302. The armrest pin may include a reduced diameter portion that approximately corresponds to the width of the arc slot 301.2 while an increased diameter portion approximately corresponds to the size of the enlarged portion 301.3.

The components of the seat, the armrest assembly 100, the armrest assembly 200, and/or the armrest assembly 300 may be formed of materials including, but not limited to, machined aluminum, carbon composite, plastic, thermoplastic, steel, aluminum, stainless steel, other plastic or polymer materials, other metallic materials, other composite materials, or other similar materials. Moreover, the components of the seat and armrest assemblies may be attached to one another via suitable fasteners, which include, but are not limited to, screws, bolts, rivets or other mechanical or chemical fasteners.

In the following, further examples are described to facilitate understanding of aspects of the invention:

Example A

An armrest assembly for a passenger seat comprising:
a pivot member attached to a seat frame;
at least one armrest spine attached to the pivot member; and
at least one set screw for adjusting a position of the pivot member relative to the seat frame, wherein:
a pivot fastener extends through a center hole of the pivot member and through a first hole of the at least one armrest spine; and
a pin extends through an arc slot of the pivot member and through a second hole of the at least one armrest spine.

Example B

The armrest assembly of Example A or any of the preceding or subsequent examples, wherein the pivot fastener also extends through a hole of an upper attachment portion of the seat frame.

Example C

The armrest assembly of Example A or any of the preceding or subsequent examples, wherein:
the at least one armrest spine is pivotably attached to the pivot member;
the at least one armrest spine rotates about the pivot fastener between a retracted position and a deployed position; and
the pin travels along a length of the arc slot when the at least one armrest spine rotates.

Example D

The armrest assembly of Example C or any of the preceding or subsequent examples, wherein the pivot member and an upper attachment portion of the seat frame form an approximately continuous cylindrical surface such that a gap between (i) a movable portion of the armrest assembly and (ii) a static portion of the armrest assembly remains constant during rotation of the at least one armrest spine.

Example E

The armrest assembly of Example C or any of the preceding or subsequent examples, wherein:
the arc slot comprises a first end and a second end;
the first end stops the pin to define a deployed position for the at least one armrest spine; and
the second end stops the pin to define a retracted position for the at least one armrest spine.

Example F

The armrest assembly of Example E or any of the preceding or subsequent examples, wherein the arc slot comprises a constant width along its full length.

Example G

The armrest assembly of Example E or any of the preceding or subsequent examples, wherein at least one of the first end and the second end comprise an enlarged portion with a larger width than other portions of the arc slot.

Example H

The armrest assembly of Example G or any of the preceding or subsequent examples, wherein:
the pin comprises at least two portions with different diameters including an increased diameter portion;
the increased diameter portion approximately matches an internal shape of the enlarged portion; and
the armrest assembly comprises a spring for pushing the increased diameter portion into the enlarged portion.

Example I

The armrest assembly of Example A or any of the preceding or subsequent examples, wherein:
the at least one set screw comprises a front set screw disposed in a hole on a front side of the seat frame and a rear set screw disposed in a hole on a rear side of the seat frame;
the front set screw engages a front face of a lower protrusion of the pivot member such that the front set screw can be threaded toward the front face to rotate the pivot member and lower a distal end of the at least one armrest spine; and
the rear set screw engages a rear face of the lower protrusion of the pivot member such that the rear set screw can be threaded toward the rear face to rotate the pivot member and raise a distal end of the at least one armrest spine.

Example J

The armrest assembly of Example I or any of the preceding or subsequent examples, wherein the lower protrusion comprises a rectangular cross section.

Example K

The armrest assembly of Example I or any of the preceding or subsequent examples, wherein the lower protrusion comprises a curved "T" shape cross section.

Example L

The armrest assembly of Example A or any of the preceding or subsequent examples, wherein:

the at least one set screw comprises a front set screw disposed in a hole on a front side of the pivot member and a rear set screw disposed in a hole on a rear side of the pivot member;

the front set screw engages a front face of an upper attachment portion of the seat frame such that the front set screw can be threaded toward the front face to rotate the pivot member and raise a distal end of the at least one armrest spine; and the rear set screw engages a rear face of the upper attachment portion of the seat frame such that the rear set screw can be threaded toward the rear face to rotate the pivot member and lower a distal end of the at least one armrest spine.

Example M

A passenger seat comprising:
a seat frame; and
an armrest assembly attached to an upper portion of the seat frame, the arm assembly comprising:
a pivot member attached to the seat frame;
an armrest spine attached to the pivot member; and
at least one set screw for adjusting a position of the pivot member relative to the seat frame, wherein:
a pivot fastener extends through a center hole of the pivot member and through a first hole of the armrest spine; and
a pin extends through an arc slot of the pivot member and through a second hole of the armrest spine.

Example N

The passenger seat of Example M or any of the preceding or subsequent examples, wherein:
the armrest spine is pivotably attached to the pivot member;
the armrest spine rotates about the pivot fastener between a retracted position and a deployed position; and
the pin travels along a length of the arc slot when the armrest spine rotates.

Example O

The passenger seat of Example N or any of the preceding or
subsequent examples, wherein the pivot member and an upper attachment portion of the seat frame form an approximately continuous cylindrical surface such that a gap between (i) a movable portion of the armrest assembly and (ii) a static portion of the armrest assembly remains constant during rotation of the armrest spine.

Example P

The passenger seat of Example N or any of the preceding or subsequent examples, wherein:
the arc slot comprises a first end and a second end;
the first end stops the pin to define a deployed position for the armrest spine; and
the second end stops the pin to define a retracted position for the armrest spine.

Example Q

The passenger seat of Example P or any of the preceding or subsequent examples, wherein at least one of the first end and the second end comprise an enlarged portion with a larger width than other portions of the arc slot.

Example R

The passenger seat of Example Q or any of the preceding or subsequent examples, wherein:
the pin comprises at least two portions with different diameters including an increased diameter portion;
the increased diameter portion approximately matches an internal shape of the enlarged portion; and
the armrest assembly comprises a spring for pushing the increased diameter portion into the enlarged portion.

Example S

The passenger seat of Example M or any of the preceding or subsequent examples, wherein:
the at least one set screw comprises a front set screw disposed in a hole on a front side of the seat frame and a rear set screw disposed in a hole on a rear side of the seat frame;
the front set screw engages a front face of a lower protrusion of the pivot member such that the front set screw can be threaded toward the front face to rotate the pivot member and lower a distal end of the armrest spine; and
the rear set screw engages a rear face of the lower protrusion of the pivot member such that the rear set screw can be threaded toward the rear face to rotate the pivot member and raise a distal end of the armrest spine.

Example T

The passenger seat of Example M or any of the preceding or subsequent examples, wherein:
the at least one set screw comprises a front set screw disposed in a hole on a front side of the pivot member and a rear set screw disposed in a hole on a rear side of the pivot member;
the front set screw engages a front face of an upper attachment portion of the seat frame such that the front set screw can be threaded toward the front face to rotate the pivot member and raise a distal end of the armrest spine; and
the rear set screw engages a rear face of the upper attachment portion of the seat frame such that the rear set screw can be threaded toward the rear face to rotate the pivot member and lower a distal end of the armrest spine.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:
1. An armrest assembly for a passenger seat comprising:
a pivot member attached to a seat frame;
at least one armrest spine attached to the pivot member; and
two set screws for adjusting a position of the pivot member relative to the seat frame, wherein:

a first of the two set screws is configured to lower a distal end of the at least one armrest spine; and
a second of the two set screws is configured to raise the distal end of the at least one armrest spine;
a pivot fastener extends through a center hole of the pivot member and through a first hole of the at least one armrest spine; and
a pin extends through an arc slot of the pivot member and through a second hole of the at least one armrest spine.

2. The armrest assembly of claim 1, wherein the pivot fastener also extends through a hole of an upper attachment portion of the seat frame.

3. The armrest assembly of claim 1, wherein:
the at least one armrest spine is pivotably attached to the pivot member;
the at least one armrest spine rotates about the pivot fastener between a retracted position and a deployed position; and
the pin travels along a length of the arc slot when the at least one armrest spine rotates.

4. The armrest assembly of claim 3, wherein the pivot member and an upper attachment portion of the seat frame form an approximately continuous cylindrical surface such that a gap between (i) a movable portion of the armrest assembly and (ii) a static portion of the armrest assembly remains constant during rotation of the at least one armrest spine.

5. The armrest assembly of claim 3, wherein:
the arc slot comprises a first end and a second end;
the first end stops the pin to define the deployed position for the at least one armrest spine; and
the second end stops the pin to define the retracted position for the at least one armrest spine.

6. The armrest assembly of claim 5, wherein the arc slot comprises a constant width along its full length.

7. The armrest assembly of claim 5, wherein at least one of the first end and the second end comprise an enlarged portion with a larger width than other portions of the arc slot.

8. The armrest assembly of claim 7, wherein:
the pin comprises at least two portions with different diameters including an increased diameter portion;
the increased diameter portion approximately matches an internal shape of the enlarged portion; and
the armrest assembly comprises a spring for pushing the increased diameter portion into the enlarged portion.

9. The armrest assembly of claim 1, wherein:
the first of the two set screws is disposed in a hole on a front side of the seat frame and engages a front face of a lower protrusion of the pivot member such that the first of the two set screws can be threaded toward the front face to rotate the pivot member.

10. The armrest assembly of claim 9, wherein the lower protrusion comprises a rectangular cross section.

11. The armrest assembly of claim 9, wherein the lower protrusion comprises a curved "T" shape cross section.

12. The armrest assembly of claim 1, wherein:
the first of the two set screws is disposed in a hole on a front side of the pivot member and engages a front face of an upper attachment portion such that the first of the two set screws can be threaded toward the front face to rotate the pivot member.

13. The armrest assembly of claim 1, wherein:
the second of the two set screws is disposed in a hole on a rear side of the seat frame and engages a rear face of a lower protrusion of the pivot member such that the second of the two set screws can be threaded toward the rear face to rotate the pivot member.

14. The armrest assembly of claim 1, wherein:
the second of the two set screws is disposed in a hole on a rear side of the pivot member and engages a rear face of an upper attachment portion such that the second of the two set screws can be threaded toward the rear face to rotate the pivot member.

15. A passenger seat comprising:
a seat frame; and
an armrest assembly attached to an upper portion of the seat frame, the arm assembly comprising:
a pivot member attached to the seat frame;
an armrest spine attached to the pivot member; and
two set screws for adjusting a position of the pivot member relative to the seat frame, wherein:
a first of the two set screws is configured to lower a distal end of the armrest spine; and
a second of the two set screws is configured to raise the distal end of the armrest spine;
a pivot fastener extends through a center hole of the pivot member and through a first hole of the armrest spine; and
a pin extends through an arc slot of the pivot member and through a second hole of the armrest spine.

16. The passenger seat of claim 15, wherein:
the armrest spine is pivotably attached to the pivot member;
the armrest spine rotates about the pivot fastener between a retracted position and a deployed position; and
the pin travels along a length of the arc slot when the armrest spine rotates.

17. The passenger seat of claim 16, wherein the pivot member and an upper attachment portion of the seat frame form an approximately continuous cylindrical surface such that a gap between (i) a movable portion of the armrest assembly and (ii) a static portion of the armrest assembly remains constant during rotation of the armrest spine.

18. The passenger seat of claim 16, wherein:
the arc slot comprises a first end and a second end;
the first end stops the pin to define the deployed position for the armrest spine; and
the second end stops the pin to define the retracted position for the armrest spine.

19. The passenger seat of claim 18, wherein at least one of the first end and the second end comprise an enlarged portion with a larger width than other portions of the arc slot.

20. The passenger seat of claim 19, wherein:
the pin comprises at least two portions with different diameters including an increased diameter portion;
the increased diameter portion approximately matches an internal shape of the enlarged portion; and
the armrest assembly comprises a spring for pushing the increased diameter portion into the enlarged portion.

21. The passenger seat of claim 15, wherein:
the first of the two set screws is disposed in a hole on a front side of the seat frame and engages a front face of a lower protrusion of the pivot member such that the first of the two set screws can be threaded toward the front face to rotate the pivot member.

22. The passenger seat of claim 15, wherein:
the first of the two set screws is disposed in a hole on a front side of the pivot member and engages a front face of an upper attachment portion such that the first of the two set screws can be threaded toward the front face to rotate the pivot member.

23. The passenger seat of claim 15, wherein:
the second of the two set screws is disposed in a hole on a rear side of the seat frame and engages a rear face of a lower protrusion of the pivot member such that the second of the two set screws can be threaded toward the rear face to rotate the pivot member.

24. The passenger seat of claim 15, wherein:
the second of the two set screws is disposed in a hole on a rear side of the pivot member and engages a rear face of an upper attachment portion such that the second of the two set screws can be threaded toward the rear face to rotate the pivot member.

* * * * *